(12) United States Patent
Li

(10) Patent No.: US 11,762,229 B2
(45) Date of Patent: Sep. 19, 2023

(54) LIQUID CRYSTAL DIMMABLE FILM

(71) Applicant: Wicue, Inc., Cupertino, CA (US)

(72) Inventor: Fenghua Li, Cupertino, CA (US)

(73) Assignee: Wicue USA Inc., Santa Clara, CA (US)

( * ) Notice: Subject to any disclaimer, the term of this patent is extended or adjusted under 35 U.S.C. 154(b) by 0 days.

(21) Appl. No.: 17/484,997

(22) Filed: Sep. 24, 2021

(65) Prior Publication Data
US 2022/0011625 A1    Jan. 13, 2022

Related U.S. Application Data

(62) Division of application No. 16/455,495, filed on Jun. 27, 2019, now abandoned.

(51) Int. Cl.
   *G02F 1/1333* (2006.01)
   *G02F 1/13357* (2006.01)
   *G02F 1/163* (2006.01)
   *G02F 1/1335* (2006.01)

(52) U.S. Cl.
   CPC ...... *G02F 1/133365* (2013.01); *G02F 1/1336* (2013.01); *G02F 1/133351* (2013.01); *G02F 1/163* (2013.01); *G02F 1/133601* (2021.01)

(58) Field of Classification Search
   None
   See application file for complete search history.

(56) References Cited

U.S. PATENT DOCUMENTS

| | | | |
|---|---|---|---|
| 8,012,548 B2 * | 9/2011 | Kim | G02F 1/13394 349/122 |
| 10,668,789 B2 | 6/2020 | Cammenga et al. | |
| 2003/0025868 A1 * | 2/2003 | Hiroshima | G02F 1/13394 349/156 |
| 2004/0196523 A1 * | 10/2004 | Nito | G02F 1/133528 359/239 |

(Continued)

FOREIGN PATENT DOCUMENTS

| | | | |
|---|---|---|---|
| DE | 102018119797 A1 * | 2/2020 | |
| EP | 2998786 | 3/2016 | |

(Continued)

OTHER PUBLICATIONS

International Search Report and Written Opinion—PCT/US2020/039292—ISA/EPO—dated Sep. 14, 2020.

(Continued)

*Primary Examiner* — Richard H Kim
(74) *Attorney, Agent, or Firm* — PV IP PC; Wei Te Chung; Zhigang Ma

(57) ABSTRACT

In one example, a crystal cell comprises: a first substrate, a second substrate, first spacers and second spacers sandwiched between the first substrate and the second substrate to define a gap between the first substrate and the second substrate, the first spacers being fixedly bonded to each of the first substrate and the second substrate, the second spacers being movable between the first and second substrates, a sealant sandwiched between the first substrate and the second substrate and enclosing the first spacers and the (Continued)

second spacers, and a liquid crystal enclosed by the sealant, the first substrate, and the second substrate. Examples of a dimmable glass incorporating liquid crystal cells and methods of manufacturing the liquid crystal cells are also provided.

23 Claims, 17 Drawing Sheets

(56) References Cited

U.S. PATENT DOCUMENTS

| | | | |
|---|---|---|---|
| 2006/0279688 A1* | 12/2006 | Wu | G02F 1/13392 349/155 |
| 2014/0176836 A1 | 6/2014 | Brecht et al. | |
| 2019/0118624 A1 | 4/2019 | Chu | |
| 2019/0256773 A1 | 8/2019 | Matsuda et al. | |
| 2020/0292858 A1 | 9/2020 | Shouhi et al. | |
| 2020/0409208 A1 | 12/2020 | Li | |
| 2021/0157197 A1* | 5/2021 | Miller, IV | G02F 1/1341 |

FOREIGN PATENT DOCUMENTS

| | | | |
|---|---|---|---|
| EP | 2998786 A1 * | 3/2016 | ....... G02F 1/133377 |
| WO | WO 2020/263929 | 12/2020 | |

OTHER PUBLICATIONS

Restriction Requirement dated Oct. 1, 2020, U.S. Appl. No. 16/455,495.
U.S. Office Action dated Dec. 10, 2020, U.S. Appl. No. 16/455,495.
U.S. Final Office Action dated Mar. 25, 2021, U.S. Appl. No. 16/455,495.
International Preliminary Report on Patentability dated Jan. 6, 2022 in PCT Application No. PCT/US2020/039292.

* cited by examiner

LIQUID CRYSTAL DIMMABLE FILM

CROSS-REFERENCE TO RELATED APPLICATIONS

This application is a divisional of U.S. Non-Provisional application Ser. No. 16/455,495, filed Jun. 27, 2019, titled "LIQUID CRYSTAL DIMMABLE FILM," which is herein incorporated by reference in its entirety for all purposes.

BACKGROUND

The disclosure relates generally to a dimmable film, and, more specifically, to a dimmable film based on liquid-crystal technology.

Dimmable film generally refers to a film having a variable light transmittance. One example of dimmable film is dimmable glass, which can be used to control an intensity of light entering or exiting from a structure. There are many applications for a dimmable glass. For example, a dimmable glass can be used to form a window of an automobile, an aircraft, etc. The light transmittance can be reduced to, for example, protect the passengers from high energy light in a bright environment. The light transmittance can also be increased to, for example, provide the passengers with improved visibility in a dim environment. As another example, a dimmable glass can be used as part of architecture glass of a building. The dimmable glass can perform the function of a blind to, for example, adjust the intensity of light entering a building, to protect privacy, etc.

Besides variable light transmittance, a dimmable glass may have various other desired properties. For example, it is desirable to increase the achievable maximum light transmittance of a dimmable glass, and to have a short response time to allow fast adjustment of the light transmittance, to provide improved visibility to a user (e.g., a driver in an automobile) under various operation conditions. Moreover, it is also desirable for the dimmable glass to have high strength and to hold together when shattered to improve safety.

BRIEF DESCRIPTION OF THE DRAWINGS

Illustrative embodiments are described with reference to the following figures.

Figure 1A:
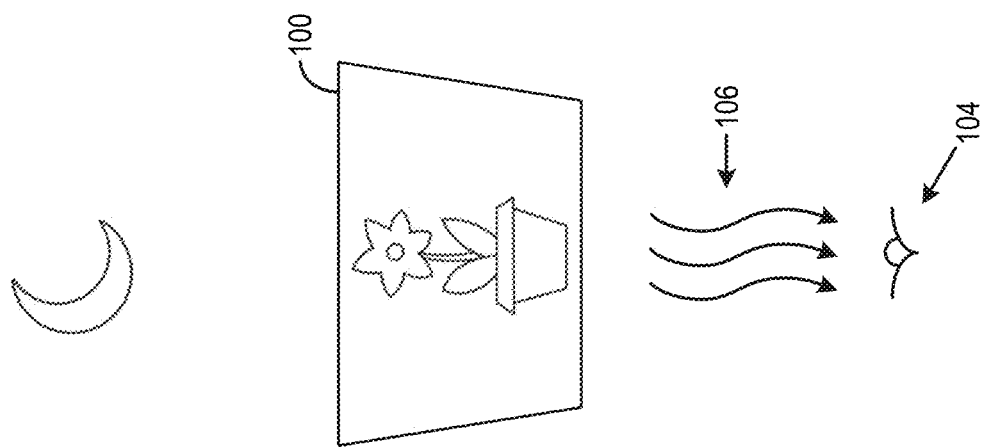
FIG. 1A and FIG. 1B illustrate an example of a dimmable glass and its applications, according to embodiments of the present disclosure.
Figure 1A:
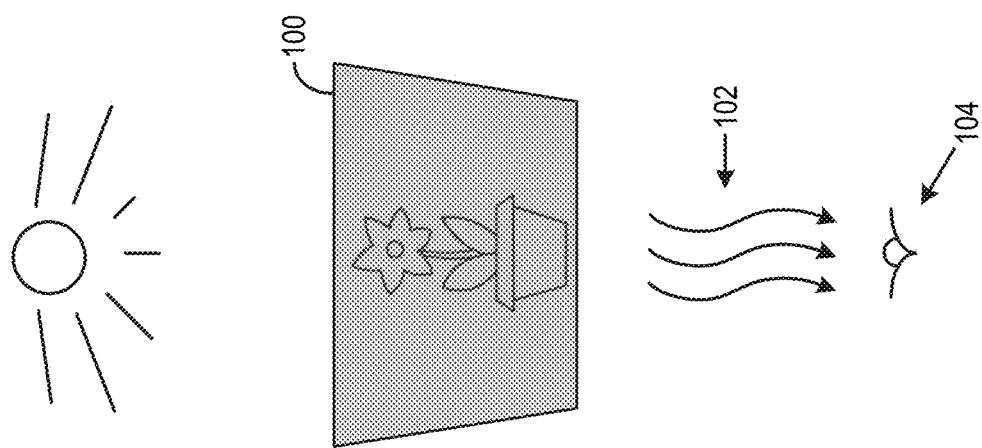

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

SUMMARY

The present disclosure relates to a liquid crystal cell. The present disclosure also relates to a dimmable film based on liquid-crystal technology.

In some examples, an apparatus comprises: a first substrate, a second substrate, as well as first spacers and second spacers sandwiched between the first substrate and the second substrate to define a gap between the first substrate and the second substrate. The first spacers are fixedly bonded to each of the first substrate and the second substrate, whereas the second spacers are movable between the first and second substrates. The apparatus further includes a sealant sandwiched between the first substrate and the second substrate and enclosing the first spacers and the second spacers, and a liquid crystal enclosed by the sealant, the first substrate, and the second substrate.

In some aspects, the first spacers and the second spacers include at least one of silica gel balls or plastic balls.

In some aspects, the first spacers include resin to provide the fixed bonding between the at least one of silica gel balls or plastic balls with each of the first substrate and the second substrate.

In some aspects, the resin comprises at least one of: an epoxy resin or an acrylic resin.

In some aspects, the first spacers are formed by printing a mixture of the silica gel balls and the resin on the first substrate via at least one of a screen or a stencil.

In some aspects, the second spacers include an adhesive to provide bonding between the silica gel balls with each of the first substrate and the second substrate.

In some aspects, each of the first substrate and the second substrate comprises a flexible material.

In some aspects, wherein the flexible material comprises at least one of: glass, polycarbonate (PC), polyethylene terephthalate (PET), or cellulose triacetate (TAC).

In some aspects, wherein each of the first substrate and the second substrate is coated with an electrical conductive material to conduct a voltage.

In some aspects, the electrical conductive material comprises Indium tin oxide (ITO).

In some aspects, each of the first substrate and the second substrate includes a Polyamide (PI) coating having a rubbing pattern to align molecules of the liquid crystal.

In some aspects, the liquid crystal comprises a guest-host (GH) liquid crystal. The PI coating of the first substrate and the PI coating of the second substrate have anti-parallel rubbing directions.

In some aspects, the GH liquid crystal cells comprise dye molecules. A color of the dye molecules is configured to set a color of light transmitted through one of the first glass layer and the second glass layer.

In some aspects, the liquid crystal comprises a twist-nematic (TN) liquid crystal. The PI coating of the first substrate and the PI coating of the second substrate have perpendicular rubbing directions.

In some aspects, the apparatus further comprises a first polarizer film and a second polarizer film sandwiching the liquid crystal.

In some examples, an apparatus comprises: a dimmable liquid crystal film including a first glass layer, a first interlayer, a liquid crystal cell, a second interlayer, and a second glass layer. The first interlayer is configured to hold fragments of the first glass layer together when the first glass layer is shattered. The second interlayer is configured to hold fragments of the second glass layer together when shattered. The liquid crystal cell is sandwiched between the first glass layer and the second glass layer and bonded to a first surface of the first glass layer via the first interlayer and bonded to a second surface of the second glass layer via the second interlayer.

In some aspects, the first interlayer and the second interlayer comprise at least one of: polyvinyl butyral (PVB), ethylene-vinyl acetate (EVA), or polyurethane (TPU). The first interlayer and the second interlayer are formed by a curing process, the curing process including applying a pressure exceeding the atmospheric pressure on the liquid crystal cell.

In some aspects, the first interlayer and the second interlayer are configured as an ultraviolet light blocking layer.

In some aspects, the liquid crystal cell comprises: a first substrate, a second substrate, as well as first spacers and second spacers sandwiched between the first substrate and the second substrate to define a gap between the first substrate and the second substrate. The first spacers being fixedly bonded to each of the first substrate and the second substrate. The second spacers being movable between the first and second substrates. The liquid crystal cell further includes a sealant sandwiched between the first substrate and the second substrate and enclosing the first spacers and the second spacers, and a liquid crystal enclosed by a sealant, the first substrate, and the second substrate.

In some aspects, each of the first substrate and the second substrate comprises a flexible material. The flexible material comprises at least one of: glass, polycarbonate (PC), polyethylene terephthalate (PET), or cellulose triacetate (TAC).

In some aspects, each of the first glass layer and the second glass has a curved surface. The first substrate and the second substrate are bent to conform with the curved surfaces of the first glass layer and the second glass layer.

In some aspects, at least one of the first glass layer or the second glass layer is coated with an infra-red blocking layer.

In some aspects, the infra-red blocking layer is formed on the at least one of the first glass layer or the second glass layer based on at least one of: thermal evaporation, electron beam evaporation, ion assisted deposition (IAD), or ion beam sputtering (IBS).

In some aspects, at least one of the first substrate or the second substrate is coated with an infra-red light blocking layer.

In some aspects, the apparatus further comprises: an infra-red film, a third interlayer, and a fourth interlayer. The infra-red film is sandwiched between the first glass layer and the liquid crystal film, or between the liquid crystal film and the second glass layer. The infra-red film is bonded to the first glass layer and the liquid crystal film, or to the liquid crystal film and the second glass layer, via respectively the third adhesive layer and the fourth adhesive layer.

In some aspects, the third interlayer and the fourth interlayer comprise at least one of: polyvinyl butyral (PVB), ethylene-vinyl acetate (EVA), or polyurethane (TPU). The third adhesive layer and the fourth adhesive layer are formed by the curing process.

In some aspects, the apparatus further comprises a privacy glass having two discrete levels of light transmittance attached to the liquid crystal film. The apparatus is configured to, in a first mode, set the light transmittance of the privacy glass to a maximum level and set a light transmittance of the liquid crystal film to a pre-determined level. The apparatus is also configured to, in a second mode, set the light transmittance of the privacy glass to a minimum level.

In some aspects, a light transmittance of the dimmable liquid crystal film is set based on an ambient light intensity. The apparatus further comprises a light sensor and driver circuits. The light sensor is configured to generate sensor data representing a measurement of the ambient light intensity. The driver circuits are configured to generate, based on the sensor data, signals to generate an electric field across the liquid crystal cell to adjust the light transmittance of the dimmable liquid crystal film based on the ambient light intensity.

In some examples, an apparatus comprises: a first glass layer, a first interlayer, a second glass layer, a second interlayer, a liquid crystal cell, a third interlayer, and a third glass layer. The first glass layer is bonded to the second glass layer via the first interlayer. The liquid crystal cell is sandwiched between second glass layer and the third glass layer and is bonded to the second glass layer via the second interlayer and to the third glass layer via the third interlayer. The first interlayer is configured to hold fragments of the first glass layer and the second glass layer together when at least one of the first glass layer or the second glass layer is shattered.

In some examples, a method comprises: forming a sealant at first pre-determined locations on at least one of a first substrate or a second substrate to define a base area of a liquid crystal cell; forming mixtures including resin and first spacers at second pre-determined locations of a first area of the first substrate corresponding to the base area of the liquid crystal cell; spraying a solution containing second spacers over a second area on the second substrate corresponding to the base area of the liquid crystal cell; spraying a solution containing first spacers on a first area on the first substrate corresponding to the base area of the liquid crystal cell; orienting the first substrate and the second substrate to enable the first spacers to join the first substrate via the resin and to enable the second spacers to join the second substrate; filling liquid crystal into a cell space defined by the sealant, the first substrate, and the second substrate; and performing a curing process to harden the sealant and to form fixed bonding between the first spacers and each of the first substrate and the second substrate via the resin.

In some aspects, filling liquid crystal into the cell space comprises: dispensing the liquid crystal into the cell space between the first substrate and the second substrate; and pressing the first substrate and the second substrate against the liquid crystal. The curing process is performed after the pressing.

In some aspects, the curing process comprises at least one of: an ultra-violet curing and a thermal curing process.

In some aspects, the method further comprises: controlling a first pair of rollers to unroll a first roll of substrate comprising the first substrate; and controlling a second pair of rollers to unroll a second roll of substrate comprising the second substrate. The pressing of the first substrate and the second substrate against the liquid crystal is performed based on moving the first substrate and the second substrate through a gap between a first roller of the first pair of rollers and a second roller of the second pair of rollers. The dispensing of the liquid crystal into the volume of space between the first substrate and the second substrate is performed when at least a part of the first substrate and at least a part of the second substrate are in the gap between the first roller and the second roller.

In some aspects, the first roller, the gap, and the second roller are aligned along a vertical axis. In some aspects, the first roller, the gap, and the second roller are aligned along a horizontal axis.

In some aspects, the mixtures are formed via at least one of: a stencil, a wire mesh, or a steel mesh.

In some aspects, the method further comprises: coating the first substrate with an electrical conductive material; coating the second substrate with an electrical conductive material; patterning the electrical conductive material on the first substrate to form a first electrode; and patterning the electrical conductive material on the second substrate to form a second electrode.

In some aspects, the patterning of the electrical conductive material on the first substrate and the second substrate comprises photolithography followed by etching.

In some aspects, the method further comprises: forming a first layer of polyamide on the first electrode; forming a second layer of polyamide on the second electrode; and rubbing the first layer of polyamide against the second layer of polyamide based on a target orientation of liquid crystal molecules on the first layer of polyamide with respect to liquid crystal molecules on the second layer of polyamide.

In some aspects, the first layer of polyamide and the second layer of polyamide are formed on, respectively, the first electrode and the second electrode based on a letterpress printing process followed by a thermal curing process.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A dimmable glass has a variable light transmittance and can be used to control an intensity of light entering or exiting from a structure. For example, a dimmable glass can be used to provide a dimmable windshield of an automobile, a dimmable window of an aircraft, a dimmable architecture glass, etc.

In addition to having variable light transmittance, a dimmable glass may have various other desired properties depending on its application. For example, in a case where a dimmable glass is used to provide a dimmable windshield or other windows of an automobile, it is desirable, or even critical, for the dimmable glass not to scatter light and to have low haze. Unlike a privacy glass which can be in an opaque state to prevent people from looking through the glass, a dimmable glass used as a windshield should never become opaque and must provide the driver with an unobstructed view. Moreover, it is also desirable or even critical for the dimmable windshield to have a short response time to allow fast adjustment of the light transmittance when the automobile is moving. For example, when the automobile is moving at high speed between a bright environment (e.g., outdoors) and a dim environment (e.g., a tunnel), it is critical for the dimmable windshield to have a short response time so that the light transmittance can be adjusted promptly to improve the driver's visibility as the automobile enters the dim environment, and to block off the strong light as the automobile enters the bright environment. Moreover, it is also critical for a dimmable windshield to have high strength, and to hold together when shattered to improve safety, as the windshield can be hit by objects when the automobile is moving at high speed.

Currently, there are technologies available to provide variable light transmittance, such as polymer dispersed liquid crystals (PDLC), electrochromic liquid, a suspended particle device (SPD), etc., but they are not suitable for certain applications, such as automobile windshields which requires low haze and short response time. Specifically, a PDLC device can include a mixture of polymers and liquid crystal molecules, with the liquid crystal molecules forming droplets suspended throughout the solid polymer. Moreover, an SPD includes metal oxide particles suspended in a liquid or a film, and the light transmittance of the SPD can be adjusted by applying an electric field to adjust the alignment of the particles. Both PDLC and SPD can exhibit high haze, as the polymer (of PDLC device) and the particles (of SPD) can scatter light. Because of the high haze, both PDLC and SPD devices can obstruct the view of the driver especially when viewed from a wide angle relative to the devices, and are not suitable for implementing automobile windshields. Moreover, both the PDLC and the SPD devices require a relatively long response time (e.g., 500 milliseconds-1000 milliseconds for PDLC, 20-30 minutes for SPD devices) and a relatively large driving voltage (e.g., 100 volts for SPD devices) to adjust the light transmittance, which can further limit the applications of SPD devices.

On the other hand, an electrochromic liquid can provide less haze. Specifically, an electrochromic liquid includes an electrolyte solution which can undergo a redox reaction in response to an electric field to adjust light transmittance. As electrochromic liquid does not have suspended particles (as in the case of SPD) or a polymer medium (as in the case of PDLC) to scatter the light, a dimming device based on electrochromic liquid can provide less haze. However, electrochromic liquid can have other shortcomings. For example, electrochromic liquid requires relatively long response time to adjust the light transmittance (e.g., 3-5 minutes), which makes electrochromic liquid unsuitable to be deployed in an environment where light intensity can change rapidly, such as automobile applications. Moreover, electrochromic liquid has a relatively short service life, which can further limit the applications of electrochromic liquid.

Another technology that can provide variable light transmittance is a liquid crystal film, which can include a liquid crystal cell. A liquid crystal cell can include a pair of substrates. The substrates can be made of flexible material to provide a curved surface according to an application (e.g., for an automobile windshield, a sunroof, a curved architecture glass, etc.). The orientations of the liquid crystal molecules can be adjusted by an electric field between the substrates to adjust the light transmittance based on various techniques. For example, the liquid crystal can employ the Guest-Host effect, in which a mixture of liquid crystal molecules (which act as host) and light-absorbing dye molecules (which act as guest) are aligned in the same direction under the electric field. The alignment direction of the dye molecules can determine a portion of light absorbed by the dye molecules to adjust the light transmittance of the liquid crystal cell. As another example, the liquid crystal can employ twisted nematic (TN) effect, in which the liquid crystal molecules can orient in a twisted nematic structure to rotate the polarization axis of incoming polarized light by a configurable angle. The liquid crystal cell may be sandwiched between a pair of polarizers and, based on the angle of rotation by the twisted nematic structure with respect to the polarizers, the light transmittance of the liquid crystal film as a whole can be set. As a liquid crystal cell does not have suspended particles (as in the case of SPD) or a polymer medium (as in the case of PDLC) to scatter the light, a dimming device based on a liquid crystal cell can provide less haze. Moreover, the response time of a liquid crystal cell for adjusting light transmittance can be relatively short (e.g., 50 milliseconds-200 milliseconds).

While the aforementioned liquid crystal film can provide the low haze, short response time, and curved surfaces needed for automobile applications, such devices may still be unsuitable for automobile applications. This is because windshields (and other windows) of automobiles are typically made of laminated glass to provide high strength, with interlayers sandwiched between the glass layers to hold the glass together in the event that the glass is shattered. The interlayers, which typically include polyvinyl butyral (PVB), ethylene-vinyl acetate (EVA), and/or polyurethane (TPU), etc., are cured under a high temperature and a high pressure in a glass lamination process to become transparent and to provide adhesion between the glass layers. The interlayers can also block ultra-violet (UV) light which can damage a liquid crystal cell. But in order to include a liquid crystal cell in the laminated glass, the liquid crystal cell may need to withstand the high temperature (e.g., up to 110 C) and high pressure (e.g., up to 1.5 times of atmospheric pressure) in the glass lamination process.

But a liquid crystal cell built with flexible substrates may deform under the high temperature and high pressure curing of the interlayers in the glass lamination process. Specifically, an LCD device may include spacers between the substrates to provide physical support and to define a cell gap distance between the substrates. But those spacers typically are weakly-bonded to the substrates and can move between the substrates. In a case where the substrates are made of flexible materials (e.g., to conform with the curvature of the glass layers), the substrates can deform under the high temperature and high pressure, and the spacers can be pushed away by the high pressure, which can decrease the cell gap distance at the pressure point. The liquid crystal can be squeezed out of the pressure point as a result, and excessive liquid crystal can gather at different locations within the deformed liquid crystal cell, which can cause liquid crystal dark spot defects.

Embodiments of the present disclosure provide a liquid crystal cell which can address some of the issues above. Specifically, a liquid crystal cell may include a first substrate, and a second substrate, as well as first spacers and second spacers sandwiched between the first substrate and the second substrate to define a gap between the first substrate and the second substrate, the first spacers being fixedly bonded to each of the first substrate and the second substrate, the second spacers being movable between the first and second substrates. The liquid crystal cell further includes a liquid crystal enclosed by a sealant, the first substrate, and the second substrate.

In some examples, the first spacers and the second spacers may include silica gel balls, plastic balls, etc. The first spacers can be fixedly bonded to the substrates via resin and can be formed by printing a mixture including the first spacers and resin on one of the substrates (e.g., the first substrate), whereas the second spacers can be formed by spraying a solution of the second spacers onto another one of the substrates (e.g., the second substrate). The density of distributions of the first spacers and the second spacers can be set based on a tolerated degree of haze as well as a target resistance to deformation of the liquid crystal cell.

With the disclosed techniques, the structural strength of a liquid crystal cell can be enhanced, which enables the liquid crystal cell to hold its shape under the high temperature and high pressure in a glass lamination process. Specifically, the first spacers can stay at their original positions with respect to the substrates under high pressure to reduce (or prevent) the deformation of the substrates under the high temperature and high pressure, which allows the second spacers to also stay at their original positions to maintain the gap distance between the substrates. As a result, the liquid crystal can remain evenly distributed within the cell space throughout the glass lamination process, and the formation of liquid crystal dark spot defects can be reduced as a result. Moreover, the distribution density and the sizes of the spacers can be optimized to provide the required rigidity while reducing the haze, to increase the achievable maximum light transmittance of the liquid crystal cell.

Embodiments of the present disclosure also provide a dimmable laminated glass comprising a liquid crystal cell. The laminated glass can be used as a window of an automobile, an aircraft, an architecture glass of a building, etc. The dimmable laminated glass comprises a first glass layer, a first interlayer, a liquid crystal cell, a second interlayer, and a second glass layer. The liquid crystal cell is bonded to the first glass layer and the second glass layer via, respectively, the first interlayer and the second interlayer. In some examples, the first interlayer and the second interlayer comprise polyvinyl butyral (PVB), ethylene-vinyl acetate (EVA), and/or polyurethane (TPU), etc. The liquid crystal cell comprises a pair of flexible substrates, as well as first spacers, second spacers, and a liquid crystal sandwiched between the substrates. The first spacers and the second spacers can define a cell gap distance between the substrates. The first spacers are fixedly bonded to the substrates via resin, whereas the second spacers are weakly bonded to the substrates and are movable between the substrates. The first spacers can be formed by printing a mixture of balls (e.g., silica gel balls, plastic balls, etc.) on one of the substrates, whereas the second spacers can be formed by spraying a solution of the silica gel balls/plastic balls onto the other one of the substrates. The distribution density and the sizes of first spacers and the second spacers are set such that the gap distance between the substrates is maintained during and after the high temperature and high pressure curing of the interlayers. The laminated glass may further include an infra-red reflective coating on the liquid crystal substrate, or an infra-red reflective film sandwiched between one of the glass layers and the liquid crystal cell, to block infra-red light.

With the embodiments of the present disclosure, an LCD device can be incorporated in a laminated glass to provide a dimmable glass that has low haze, can change light transmittance at a high speed, has high structural strength and can hold together upon shattered. All these properties enable the dimmable glass to provide dimming for automobile, aircrafts, buildings, etc. to block strong light, which not only protects users but also saves energy.

Embodiments of the present disclosure also provide a method of fabricating a liquid crystal cell. The method comprises: forming a sealant at first pre-determined locations on at least one of a first substrate or a second substrate to define a base area of a liquid crystal cell, forming mixtures containing resin and first spacers at second pre-determined locations of a first area on the first substrate corresponding to the base area of the liquid crystal cell, spraying a solution containing second spacers over a second area of the second substrate corresponding to the base area of the liquid crystal cell, orienting the first substrate and the second substrate to enable the first spacers to join the first substrate via the resin and to enable the second spacers to join the second substrate, filling liquid crystal into a cell space defined by the sealant, the first substrate, and the second substrate, and performing one or more curing processes to cure the sealant and the resin, such that the sealant is hardened and the resin fixedly bonds the first spacers with each of the first substrate and the second substrate. In some examples, the first substrate and the second substrate can be pressed against the liquid crystal to squeeze excess liquid crystal out of the sealant and the liquid crystal cell prior to the curing, and the curing of the resin can be performed after the pressing to fix the shape and the thickness of the liquid crystal cell.

In some examples, both the first substrate and second substrate are formed from rolls of flexible material comprising, for example, a thin glass substrate, polycarbonate (PC), polyethylene terephthalate (PET), cellulose triacetate (TAC), etc. The fabrication of the liquid crystal cell can be based on a roll-to-roll operation. Specifically, a first pair of rollers can be controlled to unroll a first roll of substrate to provide a plurality of first substrates, whereas a second pair of rollers can be controlled to unroll a second roll of substrate to provide a plurality of second substrates. The rolls of substrates can be coated and patterned with conductive materials (e.g., Indium tin oxide) to form electrodes for driving an electric field across the liquid crystal to control light transmittance. The rolls of substrates also include a Polyamide (PI layer) coated on top of the electrodes to set default orientations of the liquid crystal molecules. The unrolled first roll of substrate can be moved by the first pair of rollers to align with a stencil or a mesh to print the mixture of the first spacers and the resin sequentially on the plurality of first substrates, whereas the unrolled second roll of substrate can be moved by the second pair of rollers to align with a spray to spray the solution containing the second spacers sequentially on the plurality of second substrates. After printing of the first spacers on the first substrate and the spraying of the second spacers on the second substrate, the first substrate and the second substrate can move through a gap between a first roller of the first pair of rollers and a second roller of the second pair of rollers. The liquid crystal can be dispensed into the cell space between the first substrate and the second substrate when the substrates are in the gap between the first roller and the second roller. The substrates are pressed against the liquid crystal as they move through the gap to remove excessive liquid crystal. A third pair of rollers can move the plurality of first substrates and the second substrates jointly by the first spacers and the second spacers through a furnace, in which the resin and the sealant are cured.

With the disclosed fabrication techniques, LCD devices that are resistant to deformation can be fabricated at a high rate in a roll-to-roll operation, which can improve manufacture efficiency. As a result, more of such LCD devices can be incorporated in laminated glasses to provide a dimmable solution for automobiles, aircrafts, and buildings.

Figure 1B:
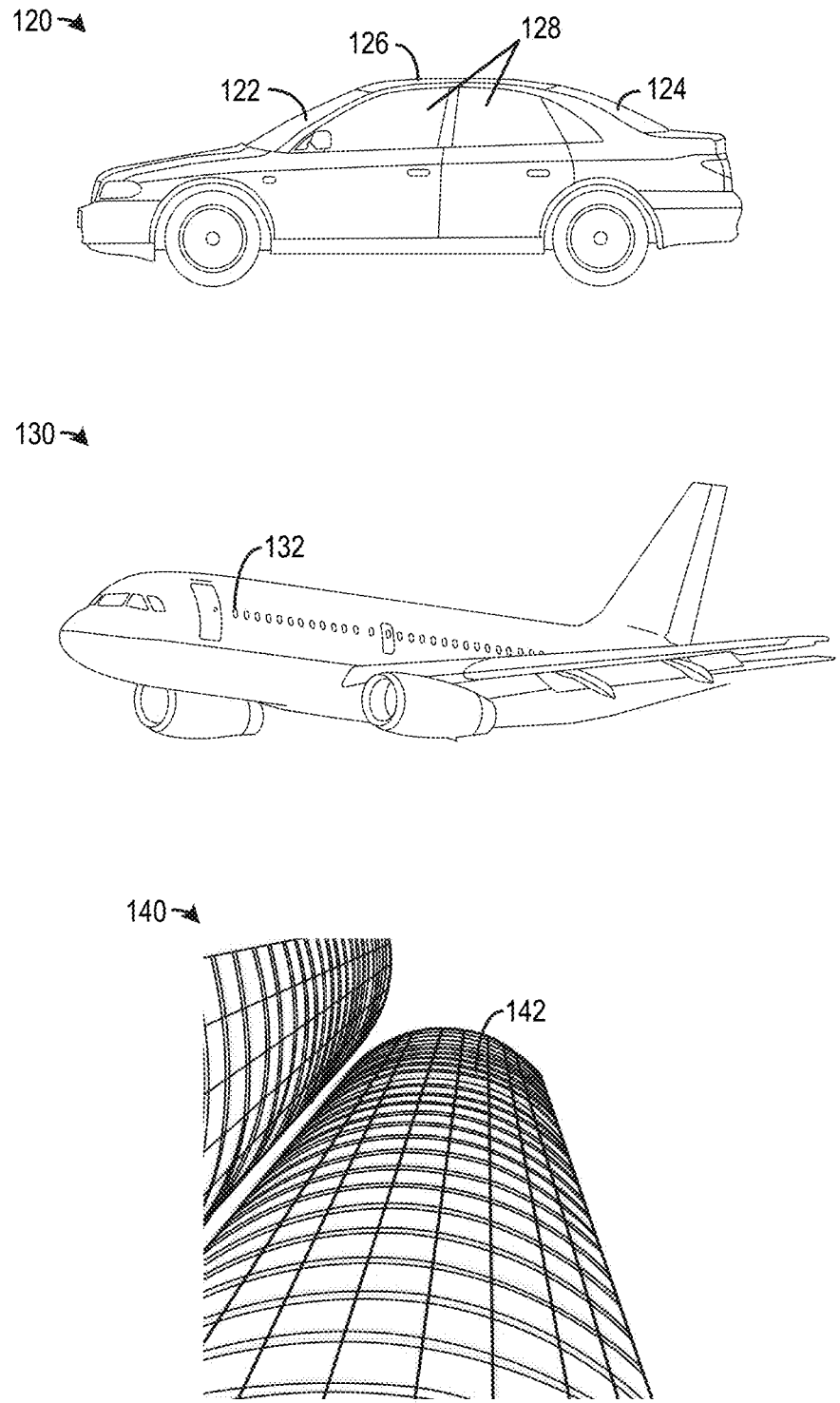

FIG. 1A and FIG. 1B illustrate an example of a dimmable glass 100 and its applications. As shown in FIG. 1A, dimmable glass 100 can have a low light transmittance in a bright environment (e.g., in the day time), and can have a high light transmittance in a dim environment (e.g., in the night time). When dimmable glass 100 has a low light transmittance, a relatively low proportion of incident light energy is transmitted via dimmable glass 100 as light 102 to a viewer 104, whereas when dimmable glass 100 has a high light transmittance, a relatively high proportion of incident light energy is transmitted as light 106 to viewer 104. The light transmittance can be controlled by a sensor that senses the ambient light intensity, manually by a switch, or by a combination of both. Besides light transmittance, dimmable glass 100 can also alter other properties of the light based on, for example, scattering the transmitted light (e.g., to create haze or a translucent appearance), controlling a wavelength of the transmitted light (e.g., to change the color of the light), etc.

Dimmable glass 100 can be used in various applications to provide a dimming solution. For example, as shown in FIG. 1B, dimmable glass 100 can be included in one or more windows of an automobile 120 including, for example, windshields 122 and 124, sunroof 126, and side windows 128. Dimmable glass 100 can also be included in portholes of an aircraft 130 (e.g., porthole 132), as well as the architecture glasses of a building 140 (e.g., exterior glass 142).

To provide dimming for automobile, aircrafts, and buildings, etc., dimmable glass 100 may have various desired properties in addition to having variable light transmittance. For example, in a case where a dimmable glass 100 is used as windshields 122 and 124 of automobile 120, dimmable glass 100 should be configured to scatter as little light as possible and to minimize haze, to provide the driver inside automobile 120 with an unobstructed view regardless of the light transmittance setting. Moreover, dimmable glass 100 also needs to have a short response time to allow fast adjustment of the light transmittance when the automobile is moving. For example, when the automobile is moving at high speed between a bright environment (e.g., outdoor) and a dim environment (e.g., a tunnel), it is critical for dimmable glass 100 to have a short response time so that the light transmittance can be adjusted promptly in response to the change in the ambient light intensity, to improve the driver's visibility.

Currently, there are technologies available to provide variable light transmittance, such as polymer dispersed liquid crystals (PDLC), electrochromic liquid, a suspended particle device (SPD), etc., but they are not suitable for automobile applications which need to provide low haze and short response time. Specifically, a PDLC device can include a mixture of polymer and liquid crystal molecules, with the liquid crystal molecules forming droplets suspended throughout the solid polymer medium. Moreover, an SPD includes metal oxide particles suspended in a liquid or a film, and the light transmittance of the SPD can be adjusted by applying an electric field to adjust the alignment of the particles. Both PDLC and SPD can exhibit high haze, as the polymer (of PDLC device) and the particles (of SPD) can scatter light. Because of the high haze, both PDLC and SPD devices can become translucent and are not suitable for implementing automobile windshields. Moreover, both the PDLC and the SPD devices require a relatively long response time (e.g., 500 milliseconds-1000 milliseconds for PDLC, 20-30 minutes for SPD devices) and a relatively large driving voltage (e.g., 100 volts for SPD devices) to adjust the light transmittance, which can further limit the applications of SPD devices.

On the other hand, an electrochromic liquid can provide less haze. An electrochromic liquid includes an electrolyte solution which can undergo a redox reaction in response to an electric field to adjust light transmittance. As electrochromic liquid does not have suspended particles (as in the case of SPD) or a polymer (as in the case of PDLC) to scatter the light, a dimming device based on electrochromic liquid can provide less haze. However, electrochromic liquid can have other shortcomings. For example, electrochromic liquid requires relatively long response time to adjust the light transmittance (e.g., 3-5 minutes), which makes electrochromic liquid unsuitable to be deployed in an environment where light intensity can change rapidly, such as automobile applications. Moreover, electrochromic liquid has a relatively short service life, which can further limit the applications of electrochromic liquid.

Figure 2A:
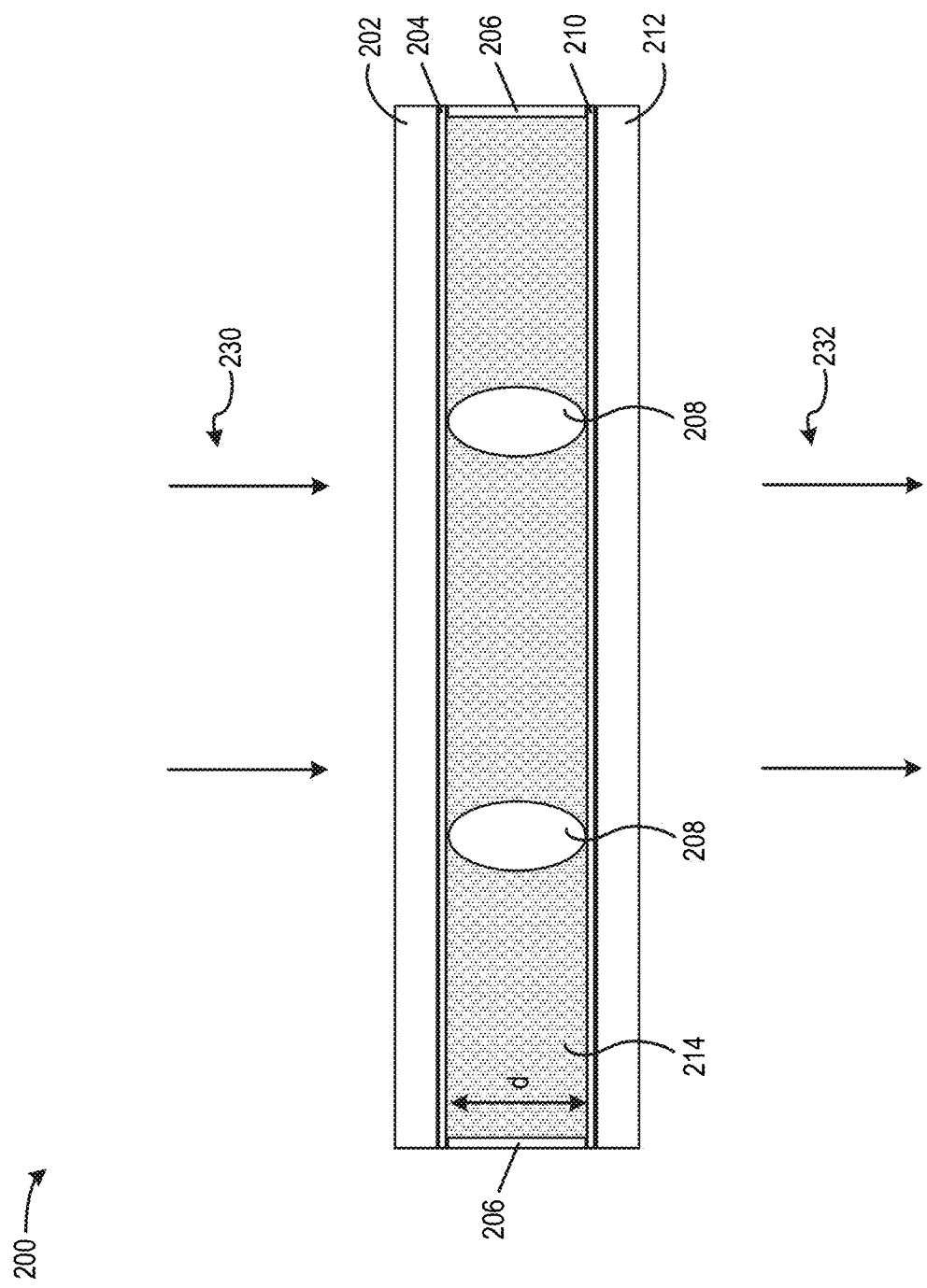
FIG. 2A-FIG. 2C illustrate an example of a liquid crystal cell and its operations according to embodiments of the present disclosure.
Figure 2B:
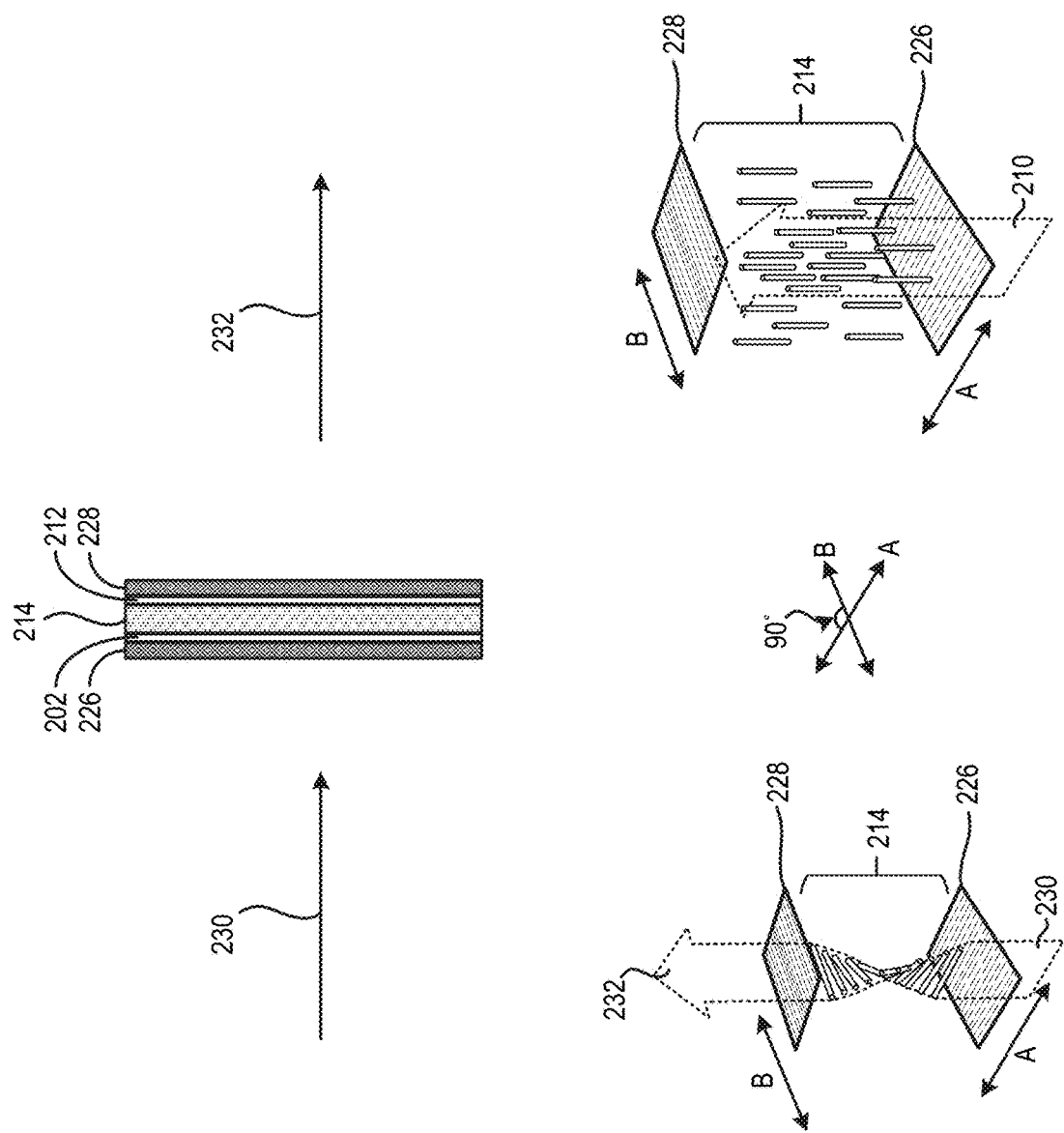
Figure 2C:
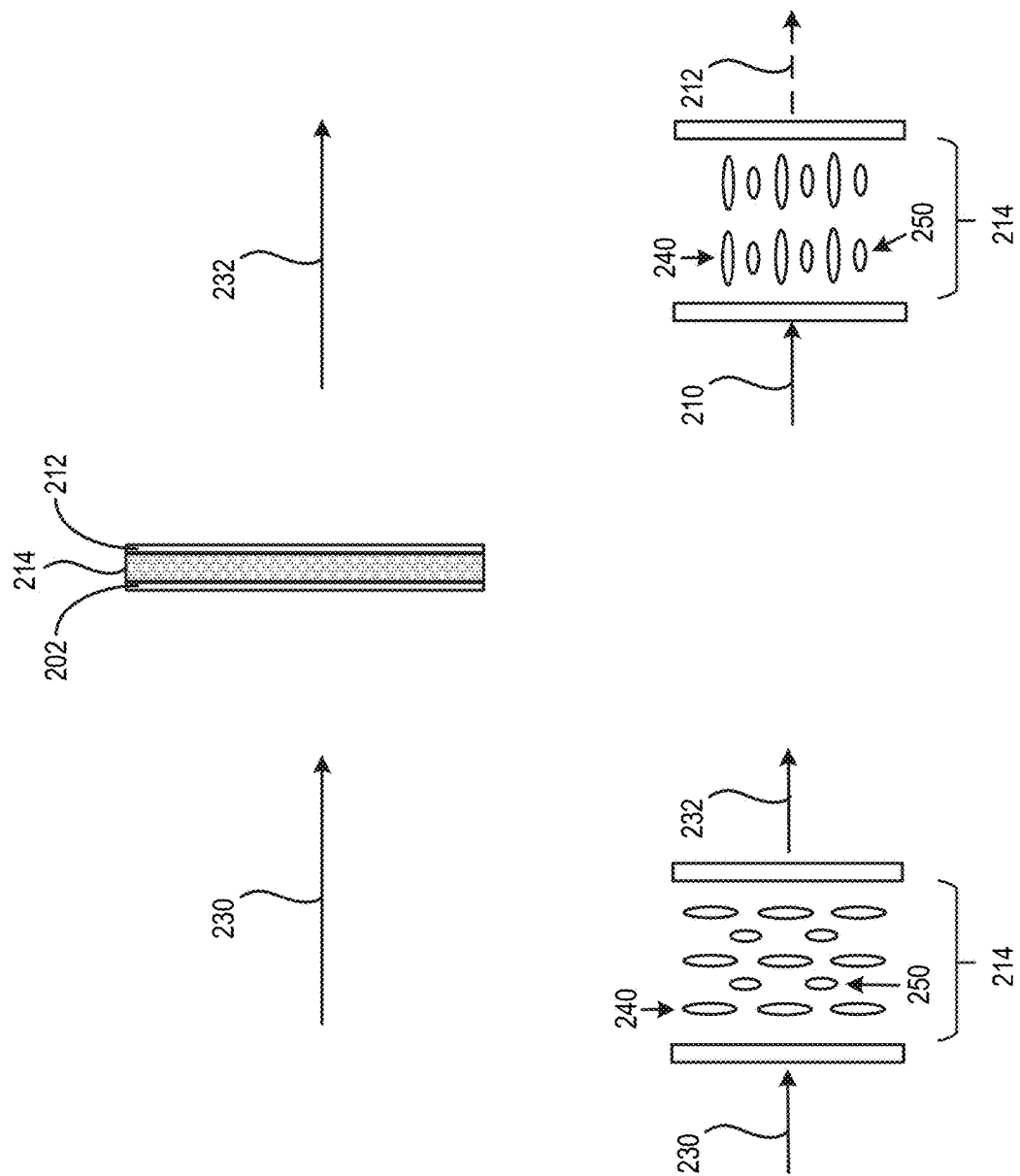

Another technology that can provide variable light transmittance is a liquid crystal cell. FIG. 2A-FIG. 2C illustrate examples of a liquid crystal cell 200 and its operations. As shown in FIG. 2A, liquid crystal cell 200 includes a first substrate 202, a first polyamide (PI) layer 204, sealant 206, spacers 208, second PI layer 210, a second substrate 212, and a liquid crystal 214. Sealant 206 can define a base area liquid crystal cell, with the cell space between first substrate 202 and second substrate 212 to be filled up by liquid crystal 214 to form the liquid crystal cell. Moreover, spacers 208 can provide structural support between first substrate 202 and second substrate 212 to maintain a cell gap distance d between the substrates. First substrate 202 and second substrate 212 can be made of transparent materials to let incoming light 230 propagate through liquid crystal 214 to become outgoing light 232. First substrate 202 and second substrate 212 can be made of materials such as glass, or a flexible material such as polycarbonate (PC), polyethylene terephthalate (PET), or cellulose triacetate (TAC), which allows liquid crystal cell 200 to conform to a curved surface such as a windshield, a curved architecture glass panel, etc. Spacers 208 can include, for example, silica gel balls, plastic balls, etc., and can be coated with a black coating to reduce light transmission. Adhesion between spacers 208 and each of first PI layer 204 and second PI layer 210 can be formed after a high temperature baking process.

Moreover, first PI layer 204 and second PI layer 210 can include rubbing patterns to align liquid crystal molecules of liquid crystal 214 in a default orientation, which can set an initial/default state of light transmittance of liquid crystal cell 200. First substrate 202 and second substrate 212 are also coated with an electrical conductive material (e.g., Indium tin oxide (ITO)) to conduct a voltage, which can lead to an electric field being applied across liquid crystal 214 to change the orientations of the liquid crystal molecules from their default orientations set by the PI layers. As to be described below, the orientations of the liquid crystal molecules of liquid crystal 214 can adjust the overall light transmittance of liquid crystal cell 200 and the intensity of outgoing light 232 exiting from the device.

FIG. 2B illustrates one example configuration of liquid crystal 214 to provide adjustable light transmittance. As shown in FIG. 2B, liquid crystal 214 can be configured as a twisted nematic (TN) liquid crystal. The liquid crystal molecules can be aligned by first PI layer 204 and second PI layer 210 to have a twisted configuration to form a helical structure. The helical structure can rotate the polarization axis of polarized light as the polarized light traverses the liquid crystal layer, with the angle of rotation adjustable by an electric field applied by a driver circuit across the liquid crystal layer. For example, as shown in FIG. 2B, if no electric field is applied, the liquid crystal molecules can be aligned by first PI layer 204 and second PI layer 210 to have a twisted configuration to form a helical structure. The helical structure causes the polarization axis of the polarized light to rotate by a certain angle (e.g., a 90 degree angle), which can be set by the alignment angles of the PI layers, as the polarized light traverses through the liquid crystal layer. Moreover, if an electric field is applied, the liquid crystal molecules can align in parallel with the electric field. The polarization axis of the polarized light can be maintained and not rotated as the light traverses the aligned liquid crystal molecules.

Liquid crystal 214, as well as first substrate 202 and second substrate 212, can be sandwiched between a first polarizer layer 226 and a second polarizer layer 228. In a normally-white configuration, first polarizer layer 226 can have a polarization axis A, whereas second polarizer layer 228 can have a polarization axis B. The two polarization axes can form a 90-degree angle with respect to each other. Incoming light 230 can become linearly polarized by first polarizer layer 226. The linearly polarized light can be rotated by liquid crystal 214 by an angle configured by the nematic structure as described above. Maximum light transmittance can be achieved in a case where no electric field is applied, such that liquid crystal 214 rotates the polarization axis of the polarized light such that it aligns with the polarization axis B of second polarizer layer 228. Minimum light transmittance can be achieved when the polarization axis of the polarized right is not rotated due to application of an electric field, such that the polarization axis of the polarized light is not rotated and becomes perpendicular to the polarization axis B of second polarizer layer 228. In such a case, the polarized light aligns with the absorption axis of second polarizer layer 228 and can be absorbed by second polarizer layer 228 at a maximum absorption rate. The electric field magnitude can be adjusted to adjust the angle of rotation of the polarized light, which can vary the portion of incoming light 230 that passes through liquid crystal cell 214 as outgoing light 232. A typical range of light transmittance achievable by TN liquid crystal can be between 0.5% to 36%.

TN liquid crystal can provide various technical advantages compared with the aforementioned PDLC, SPD, and electrochromic liquid technologies. For example, TN liquid crystal typically has extremely fast response characteristics and can adjust the light transmittance within a very short period of time (e.g., 100 milliseconds or less). Moreover, TN liquid crystal can also provide good light block property. For example, the minimum light transmittance of TN liquid crystal can reach as low as 0.1%. Moreover, as a TN liquid crystal does not have suspended particles (as in the case of SPD) or a polymer (as in the case of PDLC) to scatter the light, a dimming glass 100 incorporating a TN liquid crystal cell can provide less haze and improved visibility across a range of light transmittance.

FIG. 2C illustrates another example configuration of liquid crystal 214 to provide adjustable light transmittance. As shown in FIG. 2C, liquid crystal cell 200 includes liquid crystal 214 but not first and second polarizer layers 226 and 228. Liquid crystal 214 can be configured as a Guest-Host (GH) liquid crystal including liquid crystal molecules 240, which act as a host, and dye molecules 250, which act as a guest. Liquid crystal molecules 240 and dye molecules 250 can modulate the light transmittance based on Guest-Host effect. Specifically, depending on the type of dye molecules 250, dye molecules 250 can absorb light having an electric field that is perpendicular to the long axis of the dye molecules.

The PI layers on first substrate 202 and second substrate 212 can have anti-parallel rubbing directions to set the initial orientation of the liquid crystal molecules and dye molecules based on an operation mode of liquid crystal cell 200. In a normally white mode where a liquid crystal cell is in a transparent state when no electric field is applied, the PI layers can have rubbing directions configured such that the long axis of the dye molecules is parallel with the electric field of incoming light 230, and the absorption of light by the dye molecules can be set at the minimum. When the driver circuit applies an electric field across liquid crystal molecules 240, the orientation of liquid crystal molecules 240, as well as dye molecules 250, can be changed according to the electric field, which changes the relative orientation of the dye molecules with respect to the electric field of incoming light 230. As a result, the portion of incident light 230 absorbed by dye molecules 240, and the light transmittance of liquid crystal cell 200, can be adjusted by the electric field applied across liquid crystal 214. On the other hand, in a normally dark mode, the PI layers can have rubbing directions configured such that the long axis of the dye molecules is perpendicular to the electric field of incoming light 230, which leads to maximum absorption of light 230 by the dye molecules. The absorption can be reduced by changing the orientation of the dye molecules when an electric field is applied across the liquid crystal.

Compared with TN liquid crystal, a GH liquid crystal needs not rely on a polarizer to absorb incident light, which can increase the overall achievable light transmittance, while providing reasonable light blocking properties. For example, using the Guest-Host effect, the light transmittance range can be between 10% to 80%. Moreover, a GH liquid crystal can also have fast response characteristics and can adjust the light transmittance within a very short period of time. Further, as a GH liquid crystal does not have suspended particles or a polymer medium to scatter the light, a dimming glass 100 incorporating a GH liquid crystal cell can provide less haze and improved visibility across a range of light transmittance. Furthermore, the color of the dye molecules of the GH liquid crystal can be chosen to selectively transmit light of a particular color while blocking other colors. Such properties can be employed by dimmable glass 100 to create various visual effects involving colored lights, which can improve user experience.

The lower end of the light transmittance range of a GH liquid crystal can be further reduced to improve the light blocking properties. For example, a chiral agent can be added to GH liquid crystal to distort the liquid crystal molecules, which can cause a larger number of dye molecules to absorb the light. But the distortion of the liquid crystal molecules can lead to formation of domains of liquid crystal molecules having different orientations, which can increase the scattering of light and the resulting haze.

Various techniques are proposed to reduce the formation of liquid crystal molecule domains, as follows:
  a) A liquid crystal having a relatively large distortion coefficient of elasticity can be used as the GH liquid crystal, which allows the liquid crystal to return to its original distorted state quickly when no electric field is applied.
  b) A liquid crystal precursor having a relatively high dye solubility can be added to the liquid crystal, which can prevent dye precipitation when a large amount of dye molecules is added to the liquid crystal to improve light absorption.
  c) A high-distortion chiral agent allows the liquid crystal to achieve a higher degree of distortion with the addition of a smaller amount of chiral agent.
  d) The liquid crystal pitch p can be set based on the cell gap distance d (as shown in FIG. 2A) such that the ratio of d/p can be an integer multiple. Such arrangements allow the liquid crystal molecules to be in a relatively comparative state and haze can be reduced.
  e) The density of rubbing patterns of the PI layers, which can set the orientations of the liquid crystal molecules, can be increased to arrange the molecules in a more orderly manner, which can reduce the occurrence of domains of liquid crystal molecules having different orientations, and haze can be reduced as a result.

Referring back to FIG. 1B, a dimmable glass 100 also needs to have a requisite structural strength in order to be used as a window of an automobile, an aircraft, or a building, as dimmable glass 100 can be hit by a fast moving object, by wind, etc. To improve safety, dimmable glass 100 also needs to hold together in the event that the glass is shattered (e.g., after being hit by an object), to reduce the safety risk posed by glass fragments.

Figure 3A:
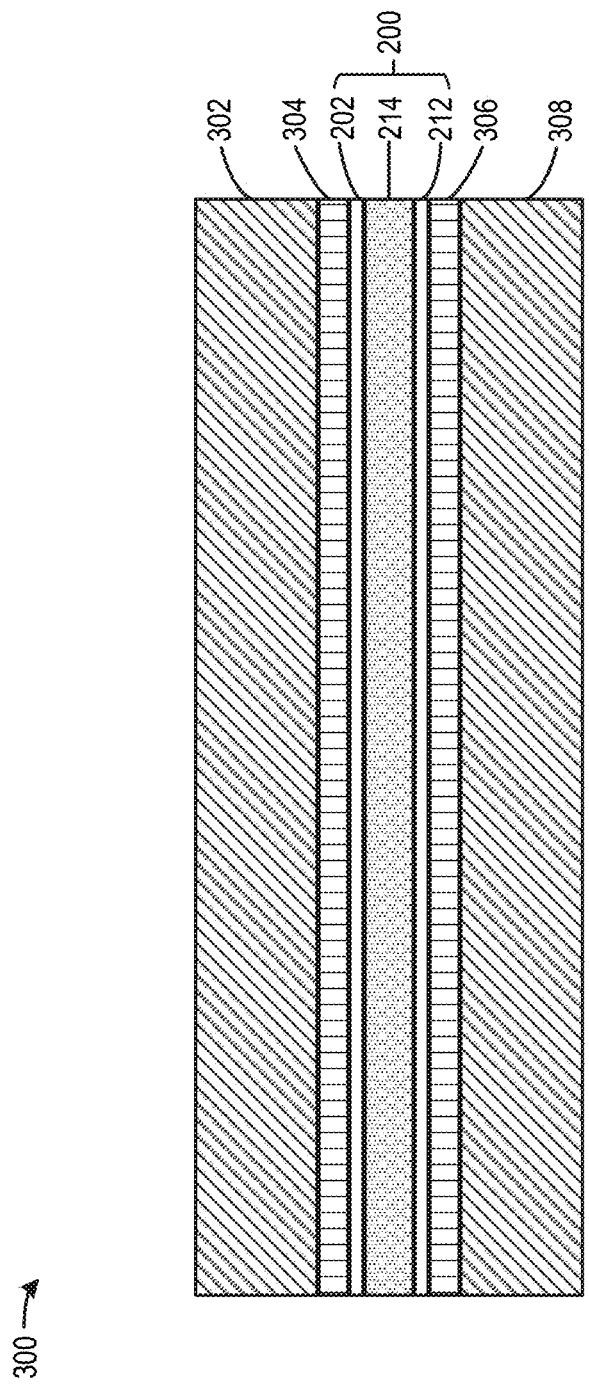
FIG. 3A-FIG. 3C illustrate a dimmable laminated glass including a liquid crystal cell according to embodiments of the present disclosure.

To improve safety and structure strength, dimmable glass 100 can be configured as a laminated glass. FIG. 3A illustrates an example of a dimmable laminated glass 300. As shown in FIG. 3A, dimmable laminated glass 300 may include a first glass layer 302, a first interlayer 304, liquid crystal cell 200 including first substrate 202, liquid crystal 214, and second substrate 212, a second interlayer 306, and a second glass layer 308. Liquid crystal cell 200 can be bonded to first glass layer 302 and second glass layer 308 via, respectively, first interlayer 304 and second interlayer 306, and can control the light transmittance of dimmable laminated glass 300 based on the techniques described above. First interlayer 304 and second interlayer 306 can include a transparent adhesive material which, in the event that first glass layer 302 and/or second glass layer 308 are shattered (e.g., after being hit by an object), can extend and hold the fragments of the glass layer together, which can reduce the safety risk posted by glass fragments. First interlayer 304 and second interlayer 306 may include a material such as, for example, polyvinyl butyral (PVB), ethylene-vinyl acetate (EVA), polyurethane (TPU), etc. These materials can also include UV-blocking capabilities to block UV light from reaching liquid crystal cell 200, as the chemical properties of liquid crystal 214 can be altered/damaged by the UV light. Thus, the interlayer can also protect and extend the life of liquid crystal cell 200.

Figure 3B:
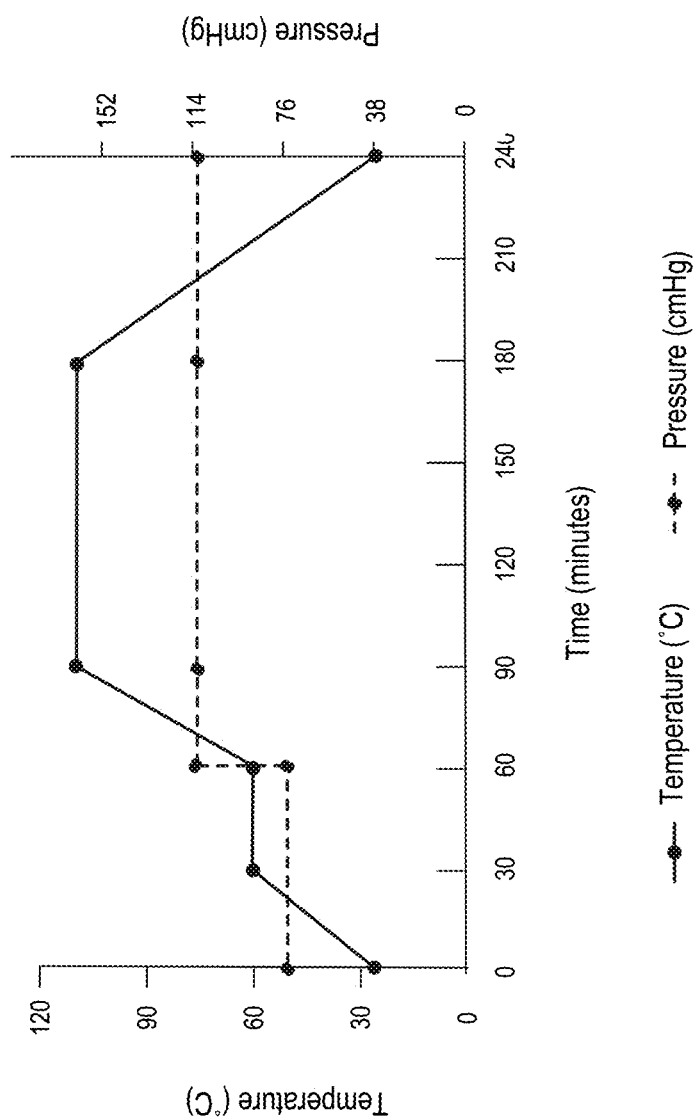

While interlayers 304 and 306 are essential to the safety of dimmable glass 300 as well as for protecting liquid crystal cell 200, the interlayer material (e.g., PVB, EVA, TPU, etc.) needs to be cured to create bonding between the glass layer and the liquid crystal cell, but the curing process can be detrimental to liquid crystal cell 200. FIG. 3B illustrates an example of a curing process. In the example curing process of FIG. 3B, the interlayer material, together with the glass layer and the liquid crystal cell to be bonded by the interlayer material, needs to be subject to a high temperature of up to 110 degrees and a high pressure of up to 114 cm-Hg (about 1.5 times of atmospheric pressure) for 90 minutes. The high temperature and high pressure curing process of the interlayers can deform liquid crystal cell 200, which can create defects such as liquid crystal dark spots. Specifically, while spacers 208 are bonded to substrates 202 and 212, the adhesive force can be relatively weak, and spacers 208 can move. This can be the case when spacers 208 are formed by a spraying process, in which the spacers are dissolved in a solvent (e.g., alcohol, water, Isopropyl Alcohol (IPA), etc.) to form a solution, and the solution containing the spacers can be sprayed evenly on the substrates. After the solvent is vaporized, the spacers are formed on the substrates. While spacers 208 can provide physical support to the substrates and can define the cell gap distance between the substrates, spacers 208 are not fixedly bonded to the substrates and can move when the substrates deform. Liquid crystal cell 200 as a whole can also deform as well.

Figure 3C:
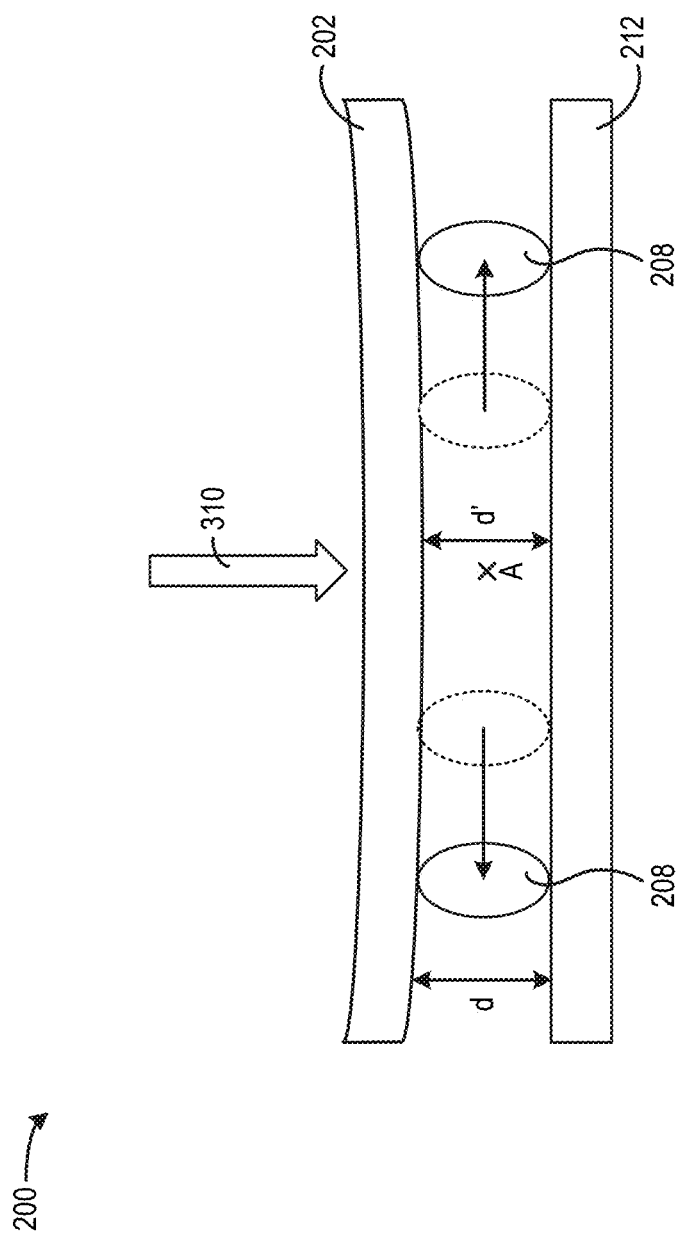

FIG. 3C illustrates an example scenario where liquid crystal cell 200 can be deformed by an external force, such as the high pressure during the glass lamination process. Referring to FIG. 3C, in a case where substrates 202 and 208 are made of a flexible material, when a force 310 is applied on substrate 202, substrate 202 can deform and push spacers 208 outward and away from their original locations (marked by dotted lines). As a result, the pressure point of liquid crystal cell 200 (marked by "A") can have a smaller gap distance d' than other locations further away from the pressure point. Liquid crystal 214 (not shown in FIG. 3C) can also move to and gather at locations within liquid crystal cell 200 having larger gap distance, which can cause liquid crystal dark spot defects.

Figure 4A:
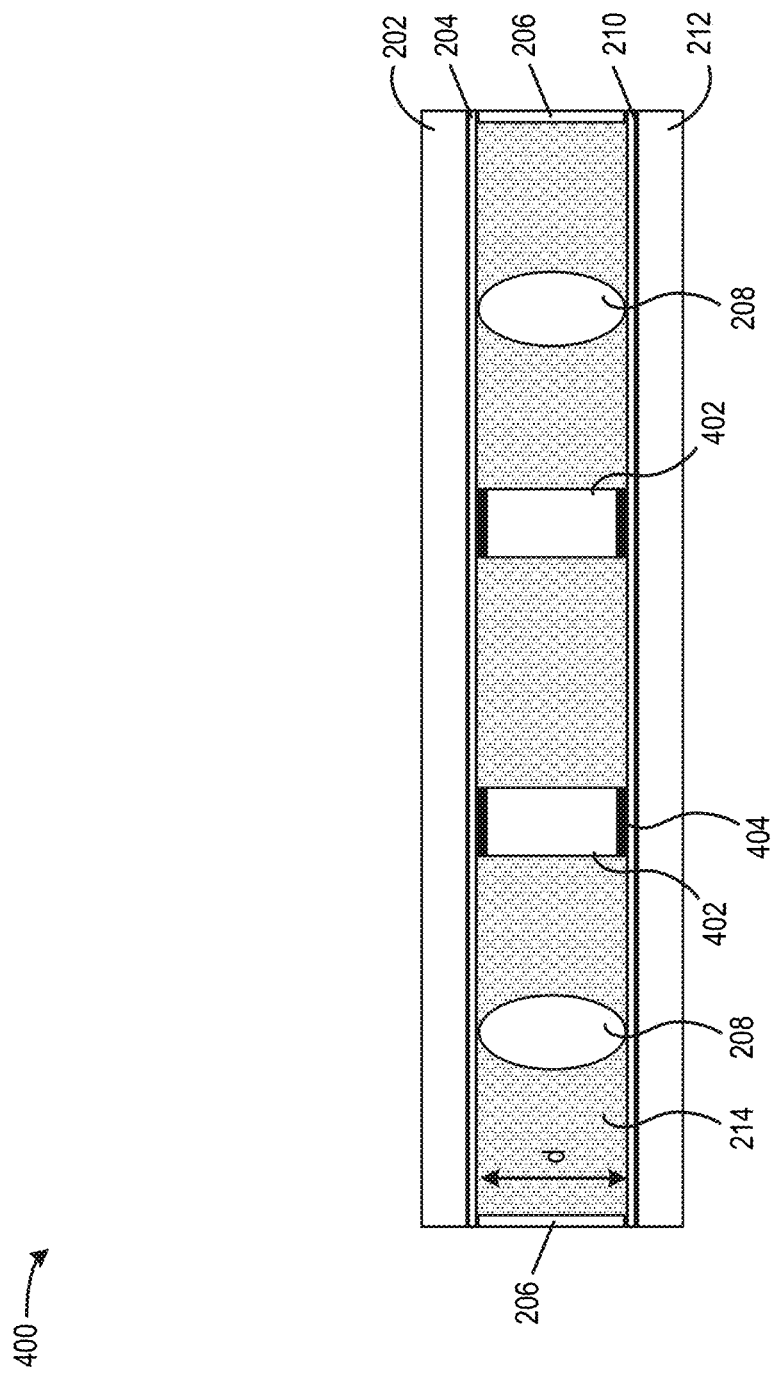
FIG. 4A and FIG. 4B illustrate another example of a liquid crystal cell according to embodiments of the present disclosure.

FIG. 4A illustrates an example of a liquid crystal cell 400 which can have enhanced resistance to deformation under high pressure and high temperature. As shown in FIG. 4A, in addition to spacers 208, liquid crystal cell 400 includes spacers 402 which can be fixedly bonded to PI layers 204 and 210 on, respectively, substrates 202 and 204. Both substrates 202 and 204 can be made of flexible materials. The bonding can be based on, for example, resin 404. Spacers 402 can include, for example, silica gel balls, plastic balls, etc.

Figure 4B:
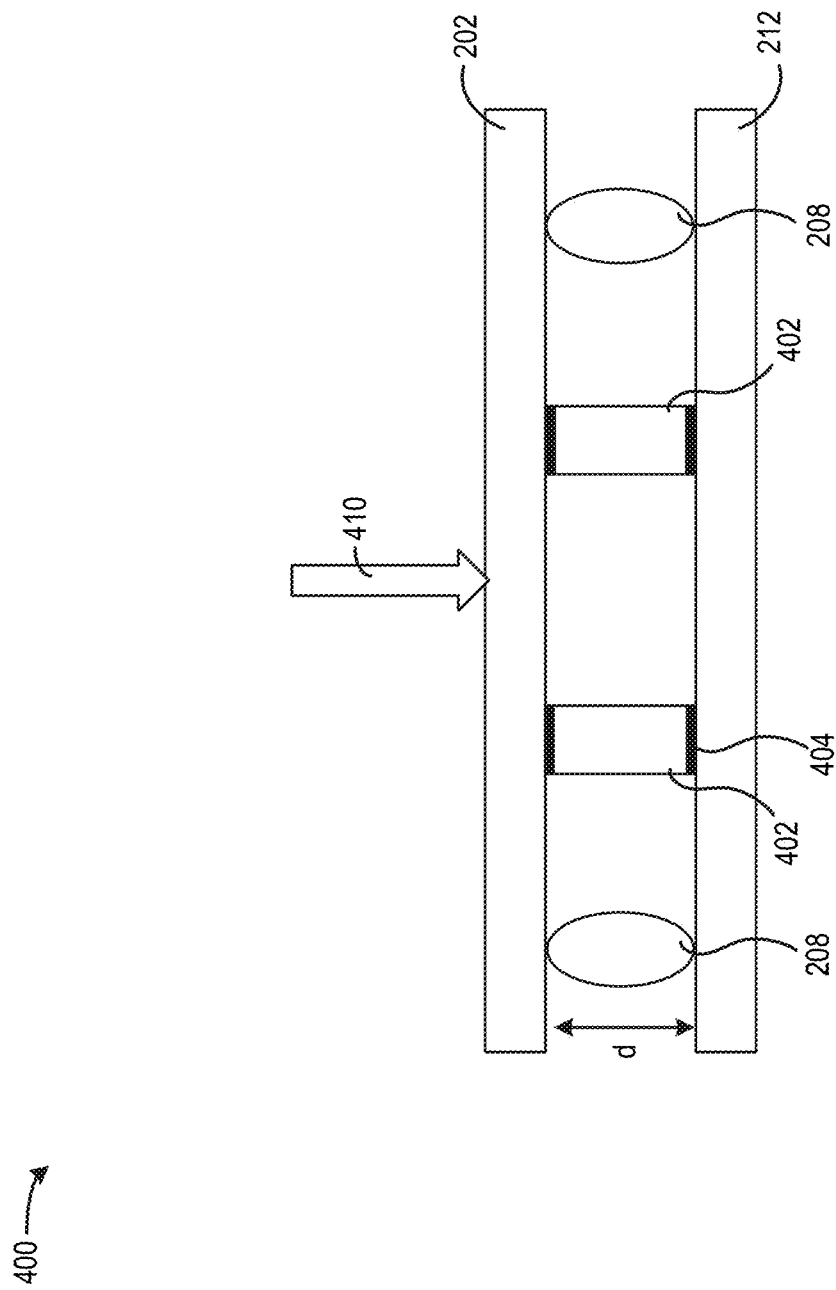

As shown in FIG. 4B, with the fixed bonding, spacers 402 can maintain their original positions with respect to substrates 202 and 204 against force 410 applied on substrate 202, which can reduce the deformation of substrate 202. Spacers 208 can also remain at their original positions to provide structural support and to maintain the gap distance d between the substrates. All these can enhance the rigidity and resistance to deformation of liquid crystal cell 400. As the deformation of liquid crystal cell 400 under the high pressure and high temperature is reduced or even eliminated, the liquid crystal can remain evenly distributed within the cell space between the substrates, and the formation of liquid crystal dark spot defects can be reduced or eliminated as a result.

In some examples, spacers 402 can be formed based on a printing process, in which mixtures of spacers 402 (e.g., silica gel balls, plastic balls, etc.) and resin 404 can be deposited on substrate 202 and/or substrate 212 via a printing process which can include, for example, a screen printing process, a stencil printing process, etc. A patterning device such as a stencil, a screen with regions of wire/steel mesh, etc. can be superimposed on the substrate(s) to define the locations of spacers 402, and mixtures of spacers 402 and resin 404 can be deposited on the substrate(s) via the patterning device. After depositing the mixtures on the substrate(s), the substrates can be oriented such that the mixtures join both substrates. The mixtures and the substrates can then be subject to a curing process, which can include exposure to UV light and heat, to form the fixed bond between the resin and the PI layers.

The sizes of spacers 208 and 404, as well as their densities of distribution between substrates 202 and 204, can be configured based on a target degree of haze and a target resistance to deformation. Specifically, the spacers have different refractive indices from liquid crystal 214 and can scatter light. Therefore, while distributing a larger number of large spacers 208 and 404 between the substrates can improve resistance to deformation of liquid crystal cell 400, the improved rigidity can come at a cost of increasing light scattering and haze. Therefore, the sizes and distribution densities of spacers 208 and 404 can be based on a trade-off between haze and rigidity. In some examples, spacers 402 can have a larger cross-sectional area than spacers 208 to increase the surface area for adhesion to the PI layers, but fewer spacers 402 can be positioned between the substrates than spacers 208 to reduce the light scattering effect caused by spacer 402. The few spacers 402 can also be positioned at locations within liquid crystal cell 400 that are likely to receive a large force during the glass lamination process to maximize the resistance to deformation of liquid crystal cell 400. Meanwhile, spacers 208 can be evenly distributed to maximize the physical support to maintain a uniform cell gap distance between the substrates at different locations of liquid crystal cell 400.

Figure 5A:
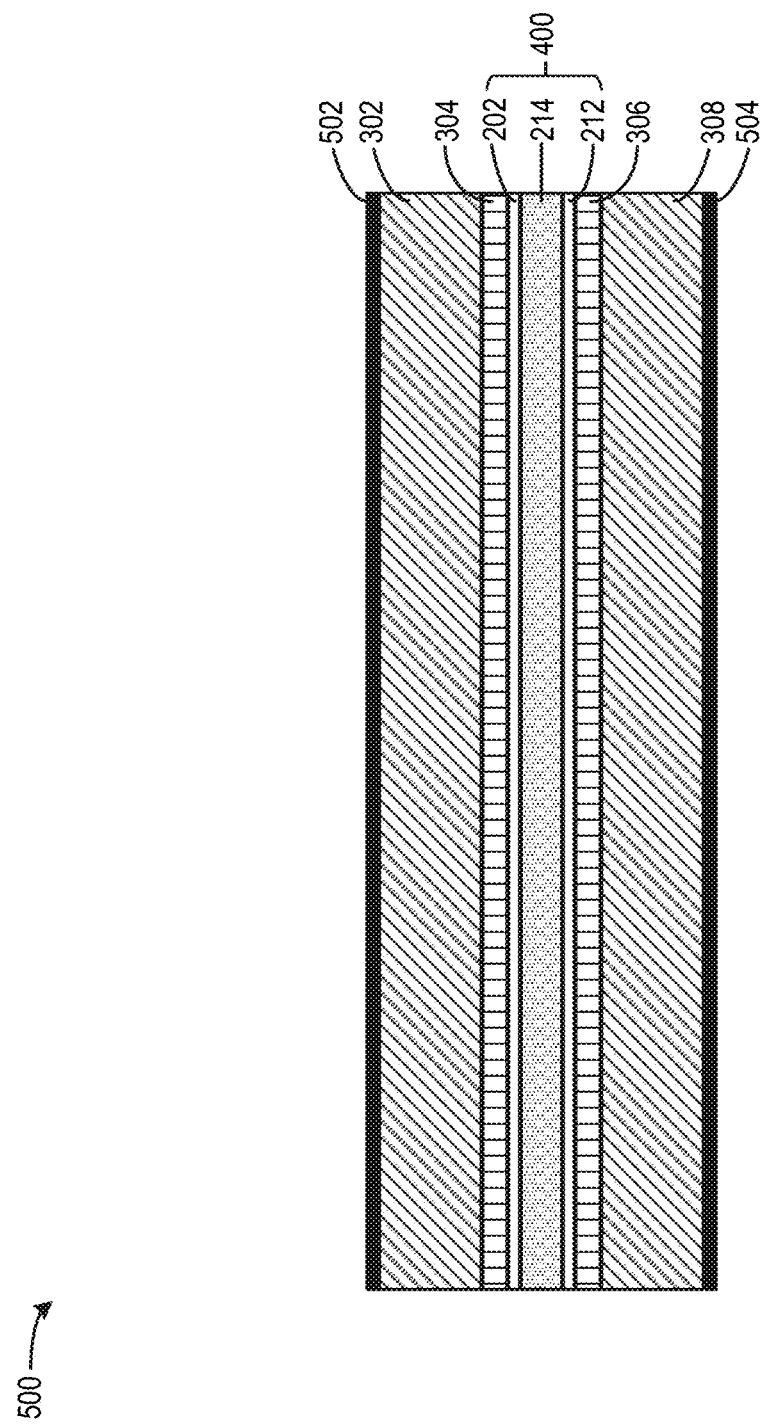
FIG. 5A-FIG. 5D illustrate examples of a dimmable laminated glass according to embodiments of the present disclosure.
Figure 5B:
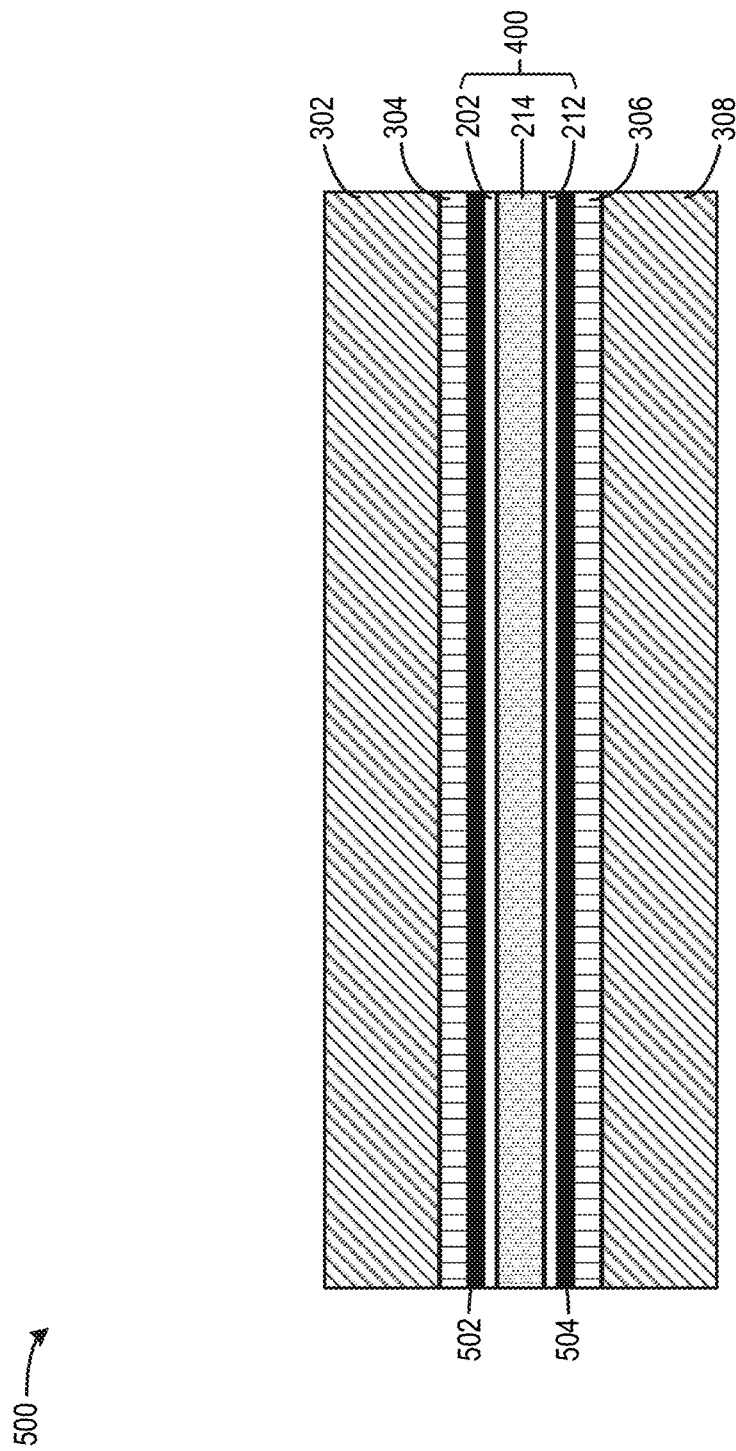

FIG. 5A-FIG. 5D illustrate examples of dimmable laminated glass 500 that can incorporate liquid crystal cell 400. As shown in FIG. 5A and FIG. 5B, dimmable laminated glass 500 can include first glass layer 302, first interlayer 304, liquid crystal cell 400 including first substrate 202, liquid crystal 214, and second substrate 212 (spacers 208 and 402 not shown), second interlayer 306, and second glass layer 308. Liquid crystal cell 400 can be bonded to first glass layer 302 and second glass layer 308 via, respectively, first interlayer 304 and second interlayer 306, and can control the light transmittance of dimmable laminated glass 500 based on the techniques described above. First interlayer 304 and second interlayer 306 can include, for example, PVB, EVA, TPU, etc.

In addition, dimmable laminated glass 500 further includes a first infra-red reflective coating 502 and a second infra-red reflective coating 504. In the example of FIG. 5A, the coatings can be formed on first glass layer 302 and second glass layer 308, whereas in the example of FIG. 5B, the coatings can be formed on first substrate 202 and second substrate 212 of liquid crystal cell 400. Infra-red reflective coating 502 and 504 can block at least a part of incident infra-red light from going through dimmable laminated glass 500 to reduce the heating effect caused by the infra-red light. For example, in a case where dimmable laminated glass 500 is used as a windshield, an architectural glass of a building, etc., the infra-red reflective coatings can insulate the cabin of the automobile or the interior of a building from infra-red light. The infra-red reflective coatings can be formed by a physical vapor deposition method, such as sputtering.

Figure 5C:
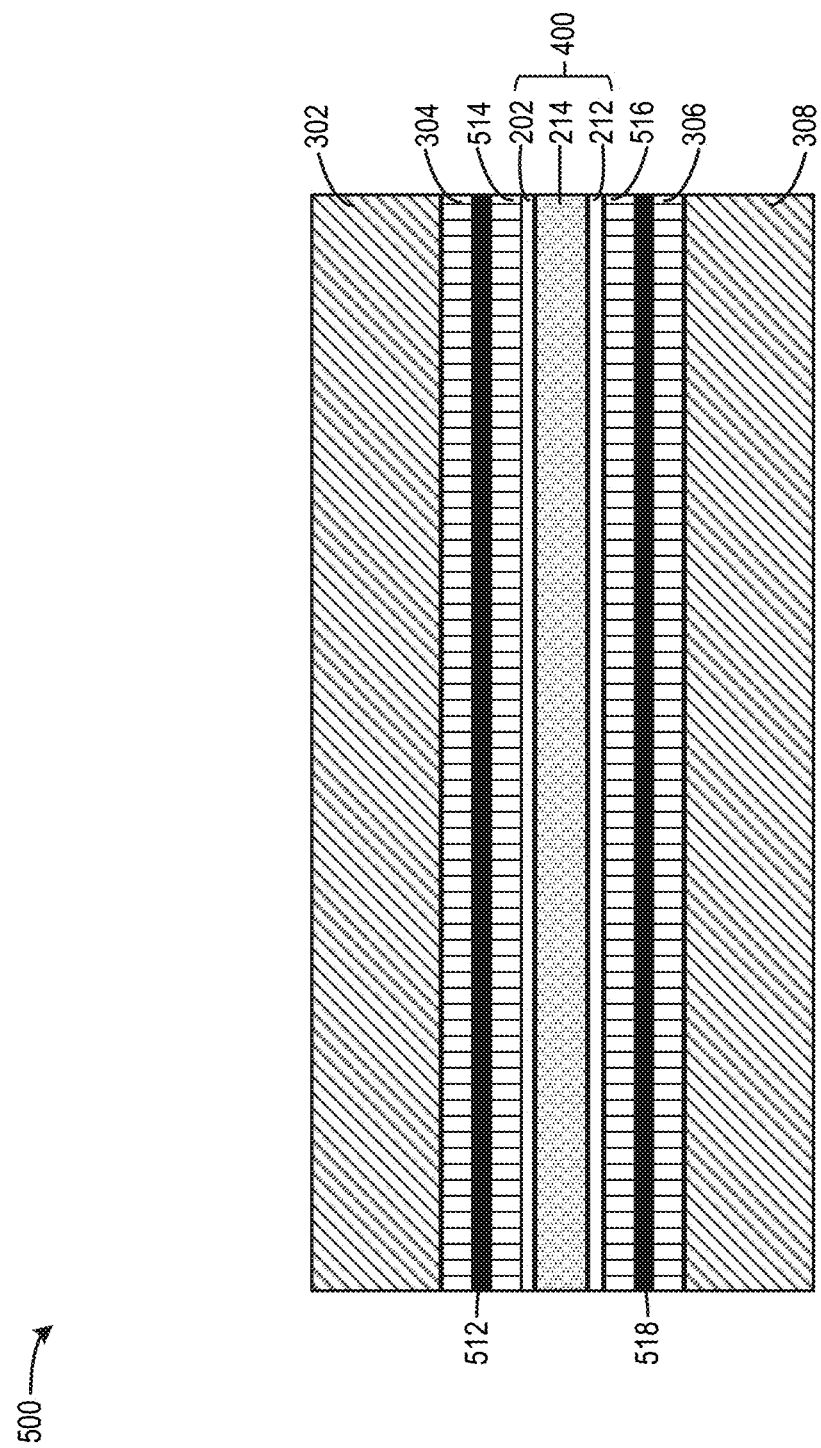

FIG. 5C illustrates another example of dimmable laminated glass 500 which can include infra-red reflective films instead of coatings. As shown in FIG. 5C, dimmable laminated glass 500 includes first glass layer 302, first interlayer 304, a first infra-red reflective film 512, a third interlayer 514, liquid crystal cell 400 including first substrate 202, liquid crystal 214, and second substrate 212 (spacers 208 and 402 not shown), a fourth interlayer 516, a second infra-red reflective film 518, second interlayer 306, and second glass layer 308. Both third inter layer 514 and fourth interlayer 516 can include PVB, EVA, TPU, etc. First infra-red reflective film 512 is bonded to first glass layer 302 and first substrate 202 via, respectively, first interlayer 304 and third interlayer 514, whereas second infra-red reflective film 518 is bonded to second substrate 212 and second glass layer 308 via, respectively, fourth interlayer 516 and second interlayer 306.

Figure 5D:
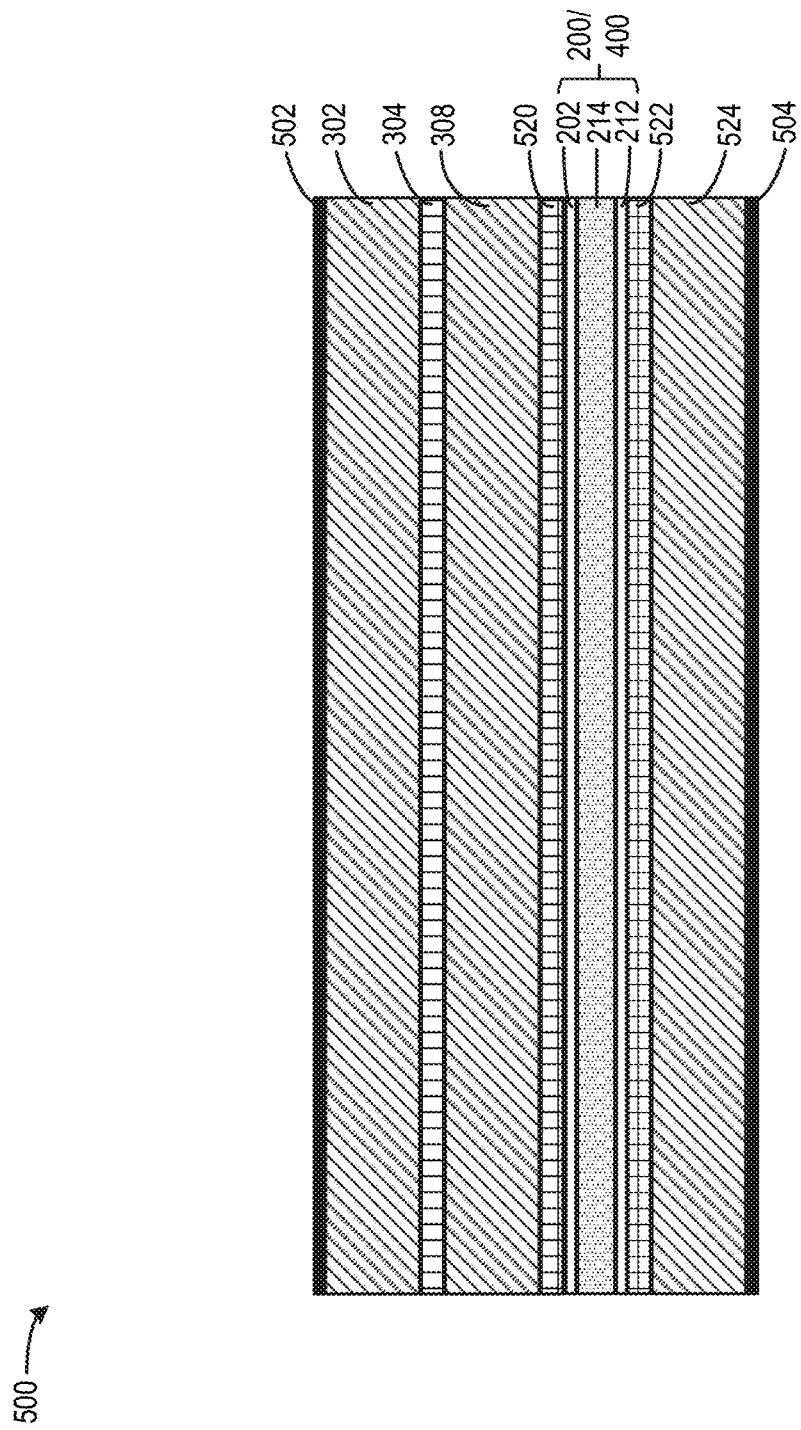

FIG. 5D illustrates another example of dimmable laminated glass 500 which can include liquid crystal cell 200 and/or liquid crystal cell 400. As shown in FIG. 5D, dimmable laminated glass 500 can include first glass layer 302, second glass layer 308, and interlayer 304 that bonds first glass layer 302 and second glass layer 308 together. Laminated glass further includes liquid crystal cell 200 (or liquid crystal cell 400) including first substrate 202, liquid crystal 214, and second substrate 212 (spacers not shown), a first adhesive layer 520 and a second adhesive layer 522, and a third glass layer 524. Liquid crystal cell 200 is sandwiched between second glass layer 308 and third glass layer 524 and is bonded to the glass layers via first adhesive layer 520 and second adhesive layer 522. Both first adhesive layer 520 and second adhesive layer 522 can include a transparent glue that can bond liquid crystal cell 200 to the glass layers. In some examples, first adhesive layer 520 and second adhesive layer 522 may include a liquid optically clear adhesive (LOCA), which can bond liquid crystal cell 200 to the glass layers after a UV curing process. In the example of FIG. 5D, dimmable laminated glass 500 can also include infra-red reflective coatings 502 and 504 on glass layers 302 and 524, or on substrates 202 and 212 of the liquid crystal cell.

The dimmable laminated glass 500 of FIG. 5D allows incorporating a LCD device to provide the dimming function without subjecting the LCD device to the high pressure and high temperature lamination process of FIG. 3B. Specifically, first glass layer 302, interlayer 304, and second glass layer 308 can be subject to the high temperature and high pressure curing process to form a laminated glass. Liquid crystal cell 200/400 can then be bonded to the laminated glass using first adhesive layer 520, followed by adhering third glass layer 524 onto liquid crystal cell 200/400 using second adhesive layer 522.

Figure 6:
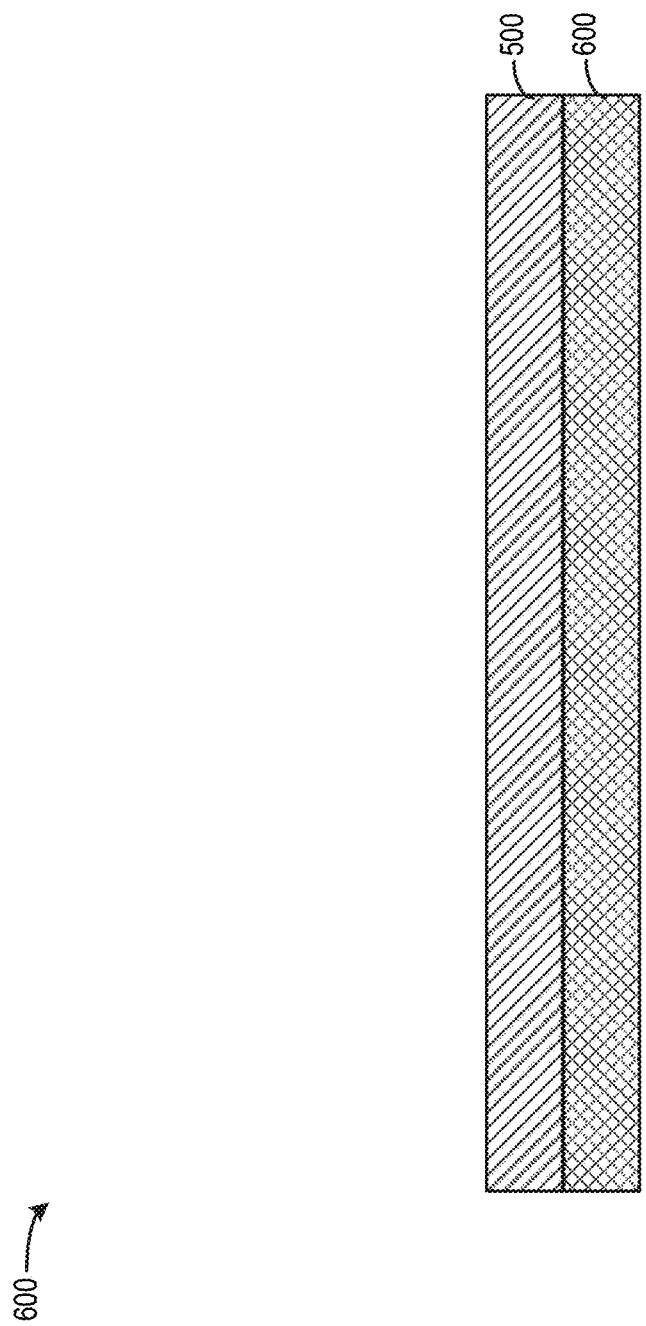
FIG. 6 illustrates another example of a dimmable laminated glass according to embodiments of the present disclosure.

FIG. 6 illustrates an example application of dimmable glass 500. As shown in FIG. 6, dimmable laminated glass 500 can be combined with a privacy glass 600 (e.g., a privacy glass incorporating PDLC technology) to provide a dimmable laminated glass 602 having multiple operation modes, such as a privacy mode, and a transparent mode having a configurable light transmittance. For example, when operating in privacy mode, privacy glass 600 can be controlled to become translucent, which also causes dimmable laminated glass 602 as a whole to become translucent. Also, when operating in a transparent mode, privacy glass 600 can be controlled to become transparent, whereas the light transmittance of dimmable laminated glass 602 as a whole can be controlled via dimmable laminated glass 500. Dimmable laminated glass 602 can be used to provide, for example, an external architecture glass of a building, internal architecture glass of meeting rooms, etc.

Figure 7:
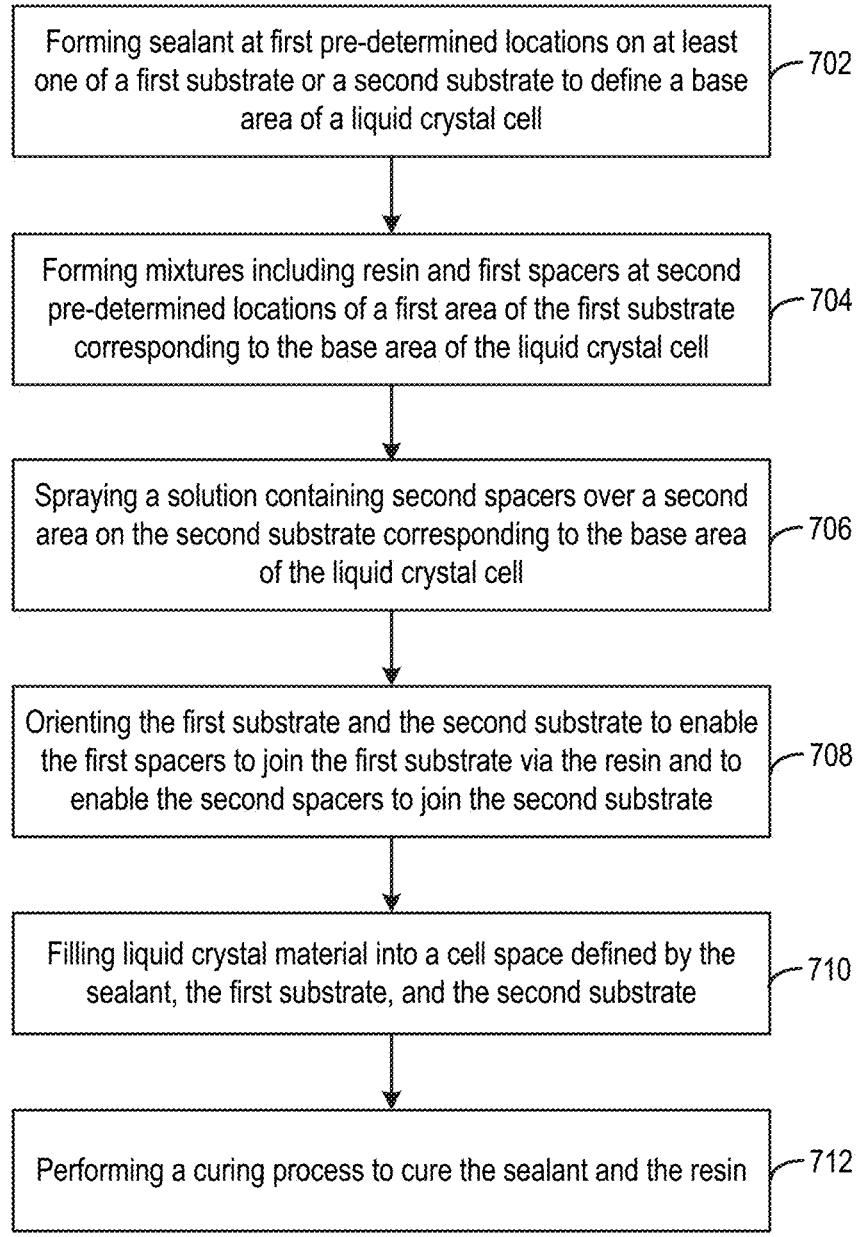
FIG. 7 illustrates an example of a method of fabricating a liquid crystal cell according to embodiments of the present disclosure.

FIG. 7 illustrates an example method 700 of fabricating a liquid crystal cell, such as liquid crystal cell 400. Method 700 starts with step 702, in which a sealant (e.g., sealant 206) can be formed at first pre-determined locations on at least one of a first substrate (e.g., first substrate 202) or a second substrate (e.g., second substrate 212) to define a base area of a liquid crystal cell. Both first substrate and second substrate can include flexible material (e.g., a thin glass substrate, polycarbonate (PC), polyethylene terephthalate (PET), cellulose triacetate (TAC), etc.). The sealant can be distributed by screen printing and/or stencil printing, in which the sealant can be distributed via openings of a screen and/or stencil at the first pre-determined locations on the substrate(s).

Prior to step 702, both substrates can be coated with a conductive material (e.g., ITO) followed by a pattern process (e.g., photolithography and etching) to form electrodes. After the electrodes are formed, a Polyamide (PI) layer can be formed on the electrodes of both substrates. The PI layers can be formed by a letterpress printing process, followed by a thermal curing process (e.g., subject to a temperature of 110° C.) through a tunnel furnace. After the thermal curing process, the cured PI layers can be rubbed against each to generate rubbing patterns to set the default orientations of the liquid crystal molecules. In a case where a TN liquid crystal cell is to be fabricated, the PI layers can be rubbed at 90 degrees from each other. In a case where a GH liquid crystal cell is to be fabricated, the PI layers can be rubbed at anti-parallel directions.

In step 704, mixtures of resin and first spacers (e.g., resin 404 and spacers 402) are formed at second pre-determined locations within a first area corresponding to the base area on the first substrate. The mixtures can be distributed by screen printing and/or stencil printing.

In step 706, a solution containing second spacers (e.g., spacers 208) is sprayed over a second area corresponding to the base area on the second substrate. The solution can include a solvent (e.g., water, alcohol, IPA, etc.) that dissolves the second spacers. After the solvent vaporizes, the second spacers can be formed on the second substrate.

In step 708, the first substrate containing the mixtures of resin and first spacers, as well as the second substrate containing the second spacers, can be oriented to enable the first spacers to join the second substrate via the resin and the second spacers to join the first substrate. Both the first spacers and the second spacers can define a cell gap distance between the substrates.

In step 710, a liquid crystal (e.g., liquid crystal 214) can be filled into a cell space defined by the sealant, the first substrate, and the second substrate to form a liquid crystal cell. The first substrate and the second substrate can also be pressed against liquid crystal to squeeze excess liquid crystal out of the sealant and the liquid crystal cell.

In step 712, the liquid crystal cell can be subject to a curing process to fix the shape and the thickness of the liquid crystal cell. During the curing process, the resin can be hardened to form a fixed bonding between the first spacer and each of the first substrate and the second substrate. The sealant can also be hardened by the curing process. The curing process includes exposing the liquid crystal cell to UV light, at a high temperature (e.g., 110° C.).

Figure 8:
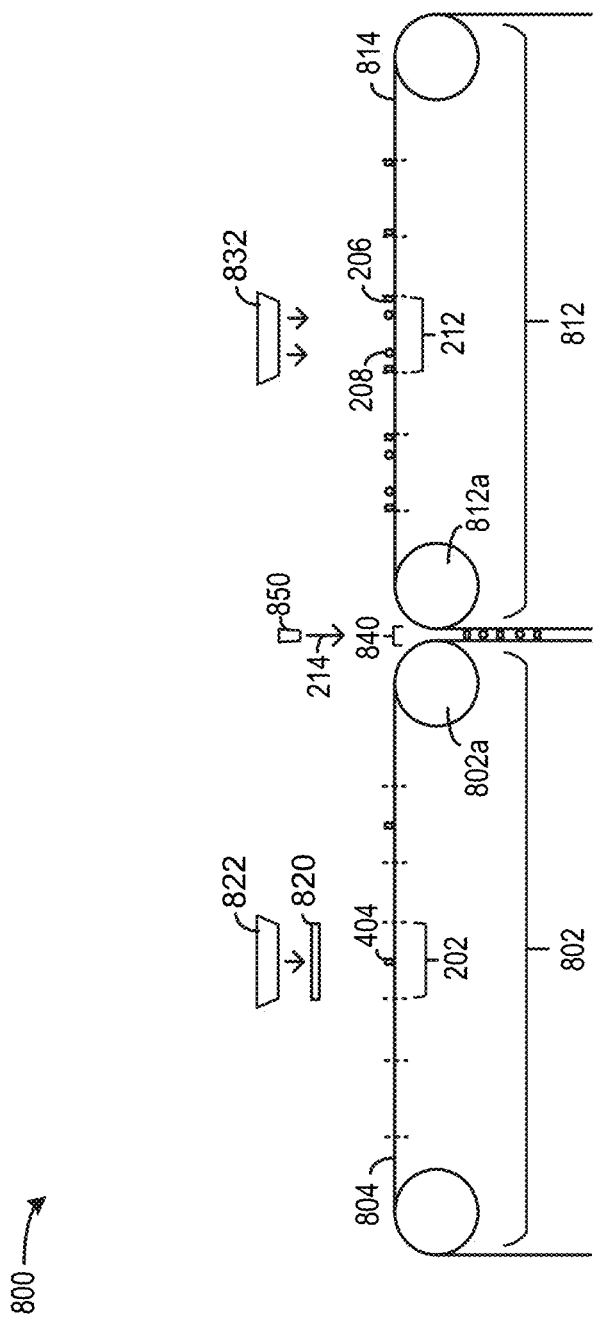
FIG. 8 illustrates an example of a roll-to-roll operation to fabricate a liquid crystal cell according to embodiments of the present disclosure.

In some examples, both the first substrate and second substrate are formed from rolls of flexible material comprising, for example, a thin glass substrate, polycarbonate (PC), polyethylene terephthalate (PET), cellulose triacetate (TAC), etc. The fabrication of the liquid crystal cell, which includes forming the electrodes, forming the PI layers, forming the spacers, and filling the liquid crystal, etc., can be performed in a roll-to-roll operation. FIG. 8 illustrates an example roll-to-roll operation 800 to fabricate a liquid crystal cell. As shown in FIG. 8, a first pair of rollers 802, including first roller 802a, can be controlled to unroll a first roll of substrate 804 to provide a plurality of first substrates (the boundaries of each first substrate are marked by dotted lines) including first substrate 202. Moreover, a second pair of rollers 812, including second roller 812a, can be controlled to unroll a second roll of substrate 814 to provide a plurality of second substrates including second substrate 212.

The unrolled first roll of substrate 804 can be moved by first pair of rollers 802 to align with a patterning device 820, which can be a stencil or a mesh. Dispenser 822 can dispense a mixture of the first spacers (e.g., spacers 402) and the resin (e.g., resin 404) sequentially on a plurality of first substrates via patterning device 820 as the unrolled first roll of substrate 804 moves. Via patterning device 820, the mixture of first spacers and the resin can be split up and deposited at pre-determined locations within an area in each first substrate corresponding to a base area of a liquid crystal cell as part of a printing process. Moreover, the unrolled second roll of substrate 814 can be moved by second pair of rollers 812 to form sealant 206 on each of the second substrates sequentially to define a cell base area, and to align with a spray 832 to spray the solution containing the second spacers (e.g., spacers 208) within the cell base area sequentially.

After the printing of the first spacers on the first substrate and the spraying of the second spacers on the second substrate, each of first substrates and the second substrates can move through a gap 840 between first roller 802a and second roller 812a. A dispenser 850 can dispense liquid crystal 214 into the cell space between the first substrate and the second substrate when the substrates are in gap 840. The substrates are pressed against liquid crystal 214 as they move through gap 840 to remove excessive liquid crystal. A third pair of rollers (not shown in FIG. 8) can move the plurality of the first substrates and second substrates jointly by the first spacers and the second spacers through a furnace, in which the resin and the sealant are cured by UV light and heat.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

I claim:

1. An apparatus comprising:
a first substrate;
a second substrate;
first spacers and second spacers positioned between the first substrate and the second substrate to define a gap between the first substrate and the second substrate, the first spacers being fixedly bonded to each of the first substrate and the second substrate, the second spacers being not fixedly bonded to either the first substrate or the second substrate;
a sealant positioned between the first substrate and the second substrate and enclosing the first spacers and the second spacers; and
a liquid crystal enclosed by the sealant, the first substrate, and the second substrate; wherein
the first spacers and the second spacers include at least one of silica gel balls or plastic balls.

2. The apparatus of claim 1, wherein the first spacers include a resin to provide the fixed bonding between the at least one of silica gel balls or plastic balls with each of the first substrate and the second substrate.

3. The apparatus of claim 2, wherein the resin comprises at least one of: an epoxy resin or an acrylic resin.

4. The apparatus of claim 2, wherein the first spacers are formed by printing a mixture of (1) the at least one of silica gel balls or plastic balls and (2) the resin on the first substrate via at least one of a screen or a stencil.

5. The apparatus of claim 2, wherein the second spacers are sprayed on the second substrate prior to joining of the first substrate and the second substrate.

6. The apparatus of claim 1, wherein each of the first substrate and the second substrate comprises a flexible material.

7. The apparatus of claim 6, wherein the flexible material comprises at least one of: glass, polycarbonate (PC), polyethylene terephthalate (PET), or cellulose triacetate (TAC).

8. The apparatus of claim 1, wherein each of the first substrate and the second substrate is coated with a conductive material to form a first electrode and a second electrode for conducting a voltage to form an electric field over the liquid crystal.

9. The apparatus of claim 8, wherein the conductive material comprises Indium tin oxide (ITO).

10. The apparatus of claim 1, wherein each of the first substrate and the second substrate includes a Polyamide (PI) coating having a rubbing pattern to align molecules of the liquid crystal.

11. The apparatus of claim 10, wherein the PI coating of the first substrate and the PI coating of the second substrate have anti-parallel rubbing directions, and wherein the liquid crystal comprises a guest-host (GH) liquid crystal.

12. The apparatus of claim 11, wherein the GH liquid crystal comprises dye molecules; and wherein a color of the dye molecules is configured to set a color of light transmitted through at least one of the first substrate or the second substrate.

13. The apparatus of claim 10, wherein the PI coating of the first substrate and the PI coating of the second substrate have perpendicular rubbing directions, and wherein the liquid crystal comprises a twist-nematic (TN) liquid crystal.

14. The apparatus of claim 13, further comprising a first polarizer film and a second polarizer film, wherein the liquid crystal, the first substrate, and the second substrate are positioned between the first polarizer film and the second polarizer film.

15. An apparatus comprising:
a first glass layer;
a second glass layer;
a first interlayer;
a second interlayer; and
a liquid crystallayered structure positioned between the first glass layer and the second glass layer, the liquid crystallayered structure being bonded to a first surface of the first glass layer via the first interlayer and bonded to a second surface of the second glass layer via the second interlayer, wherein the liquid crystallayered structure has an adjustable light transmittance and comprises a liquid crystal cell comprising:
a first substrate;
a second substrate;
first spacers and second spacers positioned between the first substrate and the second substrate to define a gap between the first substrate and the second substrate, the first spacers being fixedly bonded to each of the first substrate and the second substrate, the second spacers being not fixedly bonded to either the first substrate or the second substrate;
a sealant positioned between the first substrate and the second substrate and enclosing the first spacers and the second spacers; and
a liquid crystal enclosed by the sealant, the first substrate, and the second substrate,
wherein the first spacers and the second spacers include at least one of silica gel balls or plastic balls.

16. The apparatus of claim 15, wherein the first interlayer is configured to hold fragments of the first glass layer together when the first glass layer is shattered, and the second interlayer is configured to hold fragments of the second glass layer together when shattered.

17. The apparatus of claim 15, wherein the first interlayer and the second interlayer comprise at least one of: polyvinyl butyral (PVB), thylene-vinyl acetate (EVA), or polyurethane (TPU), and wherein the first interlayer and the second interlayer are formed by a curing process, the curing process including applying a pressure exceeding an atmospheric pressure on the liquid crystal cell.

18. The apparatus of claim 17, wherein each of the first substrate and the second substrate comprises a flexible material.

19. The apparatus of claim 18, wherein the flexible material comprises at least one of: glass, polycarbonate (PC), polyethylene terephthalate (PET), or cellulose triacetate (TAC).

20. The apparatus of claim 19, wherein at least one of the first substrate or the second substrate is coated with an infrared light blocking layer.

21. The apparatus of claim 18, wherein each of the first glass layer and the second glass layer has a curved surface, and wherein the first substrate and the second substrate are bent to conform with the curved surfaces of the first glass layer and the second glass layer.

22. The apparatus of claim 19, further comprising:
an infra-red film;
a third interlayer; and
a fourth interlayer;
wherein the infra-red film is sandwiched between the first glass layer and the liquid crystallayered structure, or between the liquid crystallayered structure and the second glass layer; and
wherein the infra-red film is bonded to the first glass layer and the liquid crystallayered structure, or to the liquid crystallayered structure and to the second glass layer, via respectively the third interlayer and the fourth interlayer.

23. The apparatus of claim 22, wherein the third interlayer and the fourth interlayer comprise at least one of: polyvinyl butyral (PVB), ethylene-vinyl acetate (EVA), or polyurethane (TPU), and wherein the third interlayer and the fourth interlayer are formed by the curing process.

* * * * *